United States Patent [19]
Kawatsu

[11] Patent Number: 5,925,476
[45] Date of Patent: Jul. 20, 1999

[54] FUEL-CELLS GENERATOR SYSTEM AND METHOD OF GENERATING ELECTRICITY FROM FUEL CELLS

[75] Inventor: Shigeyuki Kawatsu, Susono, Japan

[73] Assignee: Toyota Jidosha Kabushiki Kaisha, Toyota, Japan

[21] Appl. No.: 08/924,210

[22] Filed: Sep. 5, 1997

[30] Foreign Application Priority Data

Sep. 6, 1996 [JP] Japan ................................ 8-257601

[51] Int. Cl.⁶ .................................................. H01M 8/04
[52] U.S. Cl. ............................... 429/24; 429/23; 429/25
[58] Field of Search ............................. 429/23, 24, 25; 204/265, 266, 409

[56] References Cited

U.S. PATENT DOCUMENTS

| | | | |
|---|---|---|---|
| 4,680,240 | 7/1987 | Furukawa et al. | 429/13 |
| 5,009,967 | 4/1991 | Scheffler | 429/23 |
| 5,344,721 | 9/1994 | Sonai et al. | 429/20 |
| 5,366,821 | 11/1994 | Merritt et al. | 429/21 |
| 5,677,073 | 10/1997 | Kawatsu | 429/22 |

FOREIGN PATENT DOCUMENTS

| | | |
|---|---|---|
| 0 692 835 | 1/1996 | European Pat. Off. . |
| 0 710 996 | 5/1996 | European Pat. Off. . |
| 61-109257 | 5/1986 | Japan . |
| 5-205765 | 8/1993 | Japan . |
| 5-283091 | 10/1993 | Japan . |
| 8-138710 | 5/1996 | Japan . |

OTHER PUBLICATIONS

Patent Abstracts of Japan, vol. 096, No. 009, Sep. 30, 1996, JP 08–138710, May 31, 1996.

Schmidt, V.M., et al., Proceedings of the First Inernational Symposium on Proton Conducting Membrane Fuel Cells I, vol. 95.23, pp.1–11, "Oxidation of $H_2/CO$ in a Proton Exchange Membrane Fuel Cell", 1995.

Masayoshi Iwase, et al., Proceedings of the First Inernational Symposium on Proton Conducting Membrane Fuel Cells I, vol. 95.23, pp.12–23, "Optimized CO Tolerant Electrocatalysts for Polymer Electrolyte Fuel Cells", 1995.

*Primary Examiner*—Kathryn Gorgos
*Assistant Examiner*—Edna Wong
*Attorney, Agent, or Firm*—Oblon, Spivak, McClelland, Maier & Neustadt, P.C.

[57] ABSTRACT

A fuel-cells generator system of the present invention carries out an appropriate control to ensure a high output even when a catalyst carried on an electrode is poisoned. An electronic control unit of the fuel-cells generator system measures an output voltage E of fuel cells, a concentration D of carbon monoxide included in a gaseous fuel, a temperature T of the fuel cells, and a pressure P of the gaseous fuel at steps S100 through S130. When the output voltage E has been lowered by the amount of change that is not less than a predetermined voltage E0 at step S140 and when the concentration D of carbon monoxide measured by a carbon monoxide sensor represents the poisoned state of a catalyst carried on the anodes of the fuel cells at step S150, the temperature T of the fuel cells is gradually increased at step S180. The pressure P of the gaseous fuel is also gradually increased at step S190, in order to enable a partial vapor pressure in the gaseous fuel to be kept at a constant value even under the condition of the increased temperature of the fuel cells. This structure keeps the partial vapor pressure in the gaseous fuel at a constant level, thus preventing the partial pressure of hydrogen in the gaseous fuel from being lowered and ensuring a continuous supply of hydrogen to the anodes.

20 Claims, 28 Drawing Sheets

$Pa > Pc$
$\Delta P = \beta$ $Pa < Pc$
$\Delta P = \beta$

FUEL-CELLS GENERATOR SYSTEM AND METHOD OF GENERATING ELECTRICITY FROM FUEL CELLS

BACKGROUND OF THE INVENTION

1. Field of the Invention

The present invention relates to a fuel-cells generator system using fuel cells that receive a supply of a reaction gas fed to an electrode with a catalyst carried thereon and generate an electromotive force through a chemical reaction of the reaction gas, and also to a method of generating electricity from fuel cells.

2. Description of the Related Art

Fuel cells are a known device for directly converting chemical energy of a fuel to electrical energy. Each fuel cell includes a pair of electrodes arranged across an electrolyte, wherein the surface of one electrode is exposed to hydrogen or a hydrogen-containing gaseous fuel and the surface of the other electrode is exposed to an oxygen-containing, oxidizing gas. Electrical energy is taken out of the electrodes through electrochemical reactions.

As is known, the output of electrical energy from the fuel cells depends upon a variety of driving conditions, such as a gas pressure, a cell temperature, and a gas utilization ratio. Conventional structure enhances the output of the fuel cells by appropriately regulating these driving conditions. An example of the conventional structure is a fuel-cells generator system disclosed in JAPANESE PATENT LAYING-OPEN GAZETTE No. 5-283091. This system controls the driving temperature of the fuel cells to an ideal operating temperature (approximately 80° C. in the case of polymer electrolyte fuel cells) so as to enhance the battery output.

In case that the catalyst carried on the electrode of the fuel cells is poisoned by carbon monoxide, the control of the driving temperature of the fuel cells to the ideal operating temperature may not result in high output from the fuel cells. The applicant of the present invention has accordingly proposed an improved fuel-cells generator system disclosed in JAPANESE PATENT LAYING-OPEN GAZETTE No. 8-138710. The proposed system controls the driving temperature of the fuel cells to a predetermined temperature higher than the ideal operating temperature, thereby enhancing the output of the fuel cells even in the poisoned state of the catalyst on the electrode.

The control of the driving temperature of the fuel cells to be higher than the ideal operating temperature in the poisoned state of the catalyst on the electrode enhances the output of the fuel cells, because of the following reason. The equilibrium of adsorption and release of carbon monoxide on and from the surface of the platinum catalyst carried on the electrode in the fuel cells is shifted to the direction of releasing carbon monoxide with an increase in temperature of the fuel cells. This means that the amount of adsorption of carbon monoxide decreases with an increase in temperature of the fuel cells. When the temperature of the fuel cells becomes higher than the ideal operating temperature, the degree of this effect cancels the decrease in battery output due to the increased temperature of the fuel cells. In the poisoned state of the catalyst, the increased temperature of the fuel cells to be higher than the ideal operating temperature thus enhances the battery output.

As mentioned above, when a decrease in battery output is detected in the poisoned state of the catalyst on the electrode, the control of the driving temperature of the fuel cells to a predetermined temperature higher than the ideal operating temperature can enhance the battery output.

The prior art technique, however, can not sufficiently enhance the battery output when the temperature of the fuel cells is too high in the poisoned state of the catalyst on the electrode. In the case of polymer electrolyte fuel cells, the ideal operating temperature is approximately 80° C. In the prior art technique, the fuel cells are accordingly driven at the higher temperatures of 90° C. to 95° C. In case that the fuel cells are driven in a still higher temperature range, the reaction substance included in the gas, that is, hydrogen on the anode and oxygen on the cathode, can not be sufficiently supplied to the reaction interface of each electrode or more precisely to the surface of the catalyst. This prevents the fuel cells from being driven stably to give the high output.

SUMMARY OF THE INVENTION

The object of the present invention is thus to ensure a high output from fuel cells in a fuel-cells generator system by carrying out an appropriate control even when a catalyst carried on an electrode is poisoned.

At least part of the above and the other related objects is realized by a first fuel-cells generator system using fuel cells, which receive a supply of a reaction gas fed to an electrode with a catalyst carried thereon and generate an electromotive force through a chemical reaction of the reaction gas. The first fuel-cells generator system of the present invention includes: lowered output detection means for detecting a decrease in output of the fuel cells; poisoned state detection means for detecting a poisoned state of the catalyst; temperature control means for, when the poisoned state detection means detects the poisoned state of the catalyst and the lowered output detection means detects a decrease in output of the fuel cells, increasing temperature of the fuel cells; and gas pressure control means for regulating pressure of the reaction gas supplied to the electrode in response to the temperature control by the temperature control means, thereby enabling partial vapor pressure in the reaction gas to be kept within a predetermined range.

The equilibrium of adsorption and release of carbon monoxide on and from the surface of the catalyst carried on the electrode in the fuel cells is shifted to the direction of releasing carbon monoxide with an increase in temperature of the fuel cells. This means that the amount of adsorption of carbon monoxide decreases with an increase in temperature of the fuel cells. Extremely high temperature of the fuel cells, on the other hand, increases the partial vapor pressure in the gas and thereby lowers the partial pressure of the gas. This results in an insufficient supply of the reaction substance included in the reaction gas to the reaction interface of the electrode or more precisely to the surface of the catalyst. The first fuel-cells generator system of the present invention increases the temperature of the fuel cells while keeping the partial vapor pressure in the reaction gas within a predetermined range. This structure decreases the amount of adsorption of carbon monoxide on the catalyst carried on the electrode in the fuel cells, while ensuring a continuous supply of the reaction substance included in the reaction gas to the electrode. The structure of the present invention thus enhances the battery output when a decrease in battery output is detected in the poisoned state of the catalyst.

In accordance with one preferable application, the first fuel-cells generator system further includes: gas utilization ratio calculation means for calculating a degree of utilization of the reaction gas in the fuel cells as a gas utilization ratio; and prohibition means for, when the gas utilization ratio calculated by the gas utilization ratio calculation means is not less than a predetermined value, prohibiting operations of the temperature control means and the gas pressure control means.

In general, under the condition of the high gas utilization ratio, a decrease in battery output, which may be confused with a decrease in output due to the poisoned catalyst, is observed. The fuel-cells generator system of this structure prohibits the operations of the temperature control means and the gas pressure control means in case that the gas utilization ratio becomes equal to or greater than a predetermined value. This structure effectively prevents the unrequired control from being carried out, based on the wrong detection of the lowered output due to the poisoned catalyst. This enables the lowered battery output due to the poisoned catalyst to be recovered with high accuracy.

In accordance with another preferable application, the first fuel-cells generator system further includes: impedance measurement means for measuring an impedance of the fuel cells; and prohibition means for, when the impedance measured by the impedance measurement means is out of a predetermined range, prohibiting operations of the temperature control means and the gas pressure control means.

In general, when the impedance is out of a predetermined range, the electrolyte membrane is either too wet or too dried. Under such conditions, a decrease in battery output, which may be confused with a decrease in output due to the poisoned catalyst, is observed. The fuel-cells generator system of this structure prohibits the operations of the temperature control means and the gas pressure control means in case that the impedance is out of a predetermined range. This structure effectively prevents the unrequired control from being carried out, based on the wrong detection of the lowered output due to the poisoned catalyst. This enables the lowered battery output due to the poisoned catalyst to be recovered with high accuracy.

In the first fuel-cells generator system of the present invention, the poisoned state detection means may include: carbon monoxide concentration detection means for observing a concentration of carbon monoxide included in the reaction gas; and means for detecting the poisoned state of the catalyst, based on the observed concentration of carbon monoxide.

This structure can detect the poisoned state of the catalyst, based on the result of detection of the carbon monoxide concentration detection means.

In the fuel-cells generator system of the above structure, the carbon monoxide concentration detection means may include: an electrolyte membrane; two electrodes arranged across the electrolyte membrane and having a catalyst carried thereon; a reaction gas supply conduit for feeding a supply of the reaction gas to one of the two electrodes; an oxidizing gas supply conduit for feeding a supply of an oxygen-containing, oxidizing gas to the other of the two electrodes; potential difference measurement means for measuring a potential difference between the two electrodes under the condition that a predetermined load is connected between the two electrodes; and carbon monoxide concentration calculation means for calculating the concentration of carbon monoxide included in the reaction gas, based on the potential difference measured by the potential difference measurement means.

In this structure, when the reaction gas is led through the reaction gas supply conduit to one of the two electrodes and the oxidizing gas is led through the oxidizing gas supply conduit to the other of the two electrodes, a potential difference is generated between the two electrodes via the electrolyte membrane. Since the predetermined load is connected between the two electrodes, the existence of carbon monoxide in the reaction gas reduces the potential difference between the two electrodes. The concentration of carbon monoxide included in the reaction gas can thus be calculated from the observed potential difference. In this manner, the simple structure enables detection of the concentration of carbon monoxide.

In accordance with one preferable structure, the first fuel-cells generator system of the present invention further includes: a reformer for reforming methanol and producing a hydrogen-rich gas as the reaction gas containing hydrogen; methanol concentration detection means for observing a concentration of methanol included in the reaction gas; and reformer operation control means for, when the concentration of methanol observed by the methanol concentration detection means is not less than a predetermined level and the lowered output detection means detects a decrease in output of the fuel cells, controlling operation of the reformer, thereby lowering the concentration of methanol included in the reaction gas.

In case that a decrease in output of the fuel cells is detected while the concentration of methanol included in the reaction gas produced by the reformer is equal to or greater than a predetermined level, this preferable structure controls the operation of the reformer, so as to reduce the concentration of methanol included in the reaction gas. This structure can accordingly enhance the output of the fuel cells when the high concentration of methanol in the reaction gas causes the lowered output of the fuel cells. When the poisoned catalyst causes the lowered output of the fuel cells, the fuel-cells generator system of this structure can also enhance the output of the fuel cells in the same manner as the first fuel-cells generator system discussed above. This structure ascribes the lowered output of the fuel cells either to the poisoned catalyst or to the high concentration of methanol in the reaction gas and takes a required measure according to the cause, thereby effectively enhancing the output of the fuel cells.

In the fuel-cells generator system of this structure, the poisoned state detection means may include: an electrolyte membrane; two electrodes arranged across the electrolyte membrane and having a catalyst carried thereon; a reaction gas supply conduit for feeding a supply of the reaction gas to one of the two electrodes; an oxidizing gas supply conduit for feeding a supply of an oxygen-containing, oxidizing gas to the other of the two electrodes; potential difference measurement means for measuring a potential difference between the two electrodes; and load switching means for switching between a first state, in which a predetermined load is connected between the two electrodes, and a second state, in which the predetermined load is disconnected from the two electrodes. In this structure, the methanol concentration detection means includes methanol concentration calculation means for calculating the concentration of methanol included in the reaction gas, based on the potential difference measured by the potential difference measurement means, in the second state selected by the load switching means.

In this structure, when the reaction gas is led through the reaction gas supply conduit to one of the two electrodes and the oxidizing gas is led through the oxidizing gas supply conduit to the other of the two electrodes, a potential difference is generated between the two electrodes via the electrolyte membrane. At this moment, the load switching means selects the second state, in which the predetermined load is disconnected from the two electrodes. The existence of methanol in the reaction gas reduces the potential difference between the two electrodes. The concentration of methanol included in the reaction gas can thus be calculated from the observed potential difference.

In the fuel-cells generator system of the above structure, the poisoned state detection means may further include: carbon monoxide concentration calculation means for calculating a concentration of carbon monoxide included in the reaction gas, based on the potential difference measured by the potential difference measurement means, in the first state selected by the load switching means; and means for detecting the poisoned state of the catalyst, based on the calculated concentration of carbon monoxide.

In this structure, when the load switching means selects the first state, in which the predetermined load is connected between the two electrodes, the existence of carbon monoxide in the reaction gas reduces the potential difference between the two electrodes. The concentration of carbon monoxide included in the reaction gas can thus be calculated from the observed potential difference. When the load switching means selects the second state, in which the predetermined load is disconnected from the two electrodes, on the other hand, the concentration of methanol included in the reaction gas can be calculated as discussed above. Simple addition of the load switching means and the methanol concentration calculation means to the structure of detecting carbon monoxide enables detection of both carbon monoxide and methanol. This simple structure realizes the functions of both the poisoned state detection means and the methanol concentration detection means.

In the first fuel-cells generator system of the present invention, the fuel cells may include: an electrolyte membrane; a first electrode arranged in close contact with one surface of the electrolyte membrane as the electrode receiving a supply of the reaction gas; and a second electrode arranged in close contact with the other surface of the electrolyte membrane and receiving a supply of an oxygen-containing, oxidizing gas. In this structure, the fuel-cells generator system further includes: oxidizing gas pressure control means for regulating pressure of the oxidizing gas fed to the second electrode, thereby enabling the pressure of the oxidizing gas and the pressure of the reaction gas fed to the first electrode to satisfy a predetermined relationship.

In this structure, even when the gas pressure control means varies the pressure of the reaction gas, the oxidizing gas pressure control means enables the pressure of the reaction gas and the pressure of the oxidizing gas to satisfy a predetermined relationship. The fuel-cells generator system of this structure can be driven stably under desired pressure conditions of the reaction gas and the oxidizing gas.

In the fuel-cells generator system of the above structure, the predetermined relationship may enable the pressure of the oxidizing gas and the pressure of the reaction gas to hold a fixed order of magnitude. This structure ensures the stable operation of the fuel-cells generator system, since the order of magnitude is fixed with respect to the pressure of the reaction gas and the pressure of the oxidizing gas.

In the fuel-cells generator system of the above structure, the predetermined relationship may enable a difference between the pressure of the oxidizing gas and the pressure of the reaction gas to be not greater than a predetermined value. In general, a large pressure difference between the reaction gas and the oxidizing gas increases the pressure applied to the electrolyte membrane and may cause the electrolyte membrane to be destroyed. This structure keeps the pressure difference within the range of not greater than the predetermined value, thereby protecting the electrolyte membrane from damages.

In the fuel-cells generator system of the above structure, the predetermined relationship may enable a difference between the pressure of the oxidizing gas and the pressure of the reaction gas to be kept constant. This structure also prevents the electrolyte membrane from being damaged by the pressure difference.

In accordance with another preferable application, the first fuel-cells generator system further includes: restoration means for, when no decrease in output of the fuel cells is detected by the lowered output detection means after execution of the pressure regulation of the reaction gas by the gas pressure control means, returning the temperature of the fuel cells to a non-controlled temperature of the fuel cells, which represents a value before the increase by the temperature control means, and returning the pressure of the reaction gas to a non-controlled pressure of the reaction gas, which represents a value before the regulation by the gas pressure control means.

In this structure, after the lowered battery output due to the poisoned catalyst is recovered, the controlled temperature of the fuel cells and the controlled pressure of the reaction gas are returned to the original values. The fuel-cells generator system can thus be driven under the condition of the non-controlled fuel cell temperature and fuel gas pressure, which represent values before the decrease in output voltage, in order to give a desired output voltage.

The present invention is also directed to a first method of generating electricity from fuel cells, which receive a supply of a reaction gas fed to an electrode with a catalyst carried thereon and generate an electromotive force through a chemical reaction of the reaction gas. The first method includes the steps of:

(a) controlling temperature of the fuel cells to be higher than an ideal operating temperature; and (b) regulating pressure of the reaction gas supplied to the electrode in response to the temperature control carried out in the step (a), thereby enabling partial vapor pressure in the reaction gas to be kept within a predetermined range.

In the first method of the present invention, the step (a) controls the temperature of the fuel cells to be higher than the ideal operating temperature, and the step (b) controls the pressure of the reaction gas supplied to the electrode. This structure regulates the pressure of the reaction gas, in order to enable the partial vapor pressure in the reaction gas to be kept in the predetermined range even under the condition of the increased temperature of the fuel cells.

Extremely high temperature of the fuel cells heightens the partial vapor pressure in the reaction gas and prevents a continuous supply of the reaction gas to the surface of the catalyst. The first method of the present invention, however, keeps the partial vapor pressure in the reaction gas within the predetermined range, thereby ensuring a continuous supply of the reaction substance included in the reaction gas. Even when the temperature of the fuel cells becomes higher than the ideal operating temperature, this structure ensures the high output of the fuel cells.

The present invention is further directed to a second method of generating electricity from fuel cells, which receive a supply of a reaction gas fed to an electrode with a catalyst carried thereon and generate an electromotive force through a chemical reaction of the reaction gas. The second method includes the steps of:

(a) detecting a decrease in output of the fuel cells;

(b) detecting a poisoned state of the catalyst;

(c) when the poisoned state of the catalyst is detected in the step (b) and a decrease in output of the fuel cells is detected in the step (a), increasing temperature of the fuel cells; and (d) regulating pressure of the reaction gas supplied to the electrode in response to the temperature control carried out in the step (c), thereby enabling partial vapor pressure in the reaction gas to be kept within a predetermined range.

The second method of the present invention has the same functions and the effects as the first fuel-cells generator system of the present invention, and effectively enhances the battery output when a decrease in battery output is detected in the poisoned stated of the catalyst.

These and other objects, features, aspects, and advantages of the present invention will become more apparent from the following detailed description of the preferred embodiments with the accompanying drawings.

DESCRIPTION OF THE PREFERRED EMBODIMENTS

In order to further clarity the structures and functions of the present invention, some modes of carrying out the present invention are discussed below as preferred embodiments.

Figure 1:
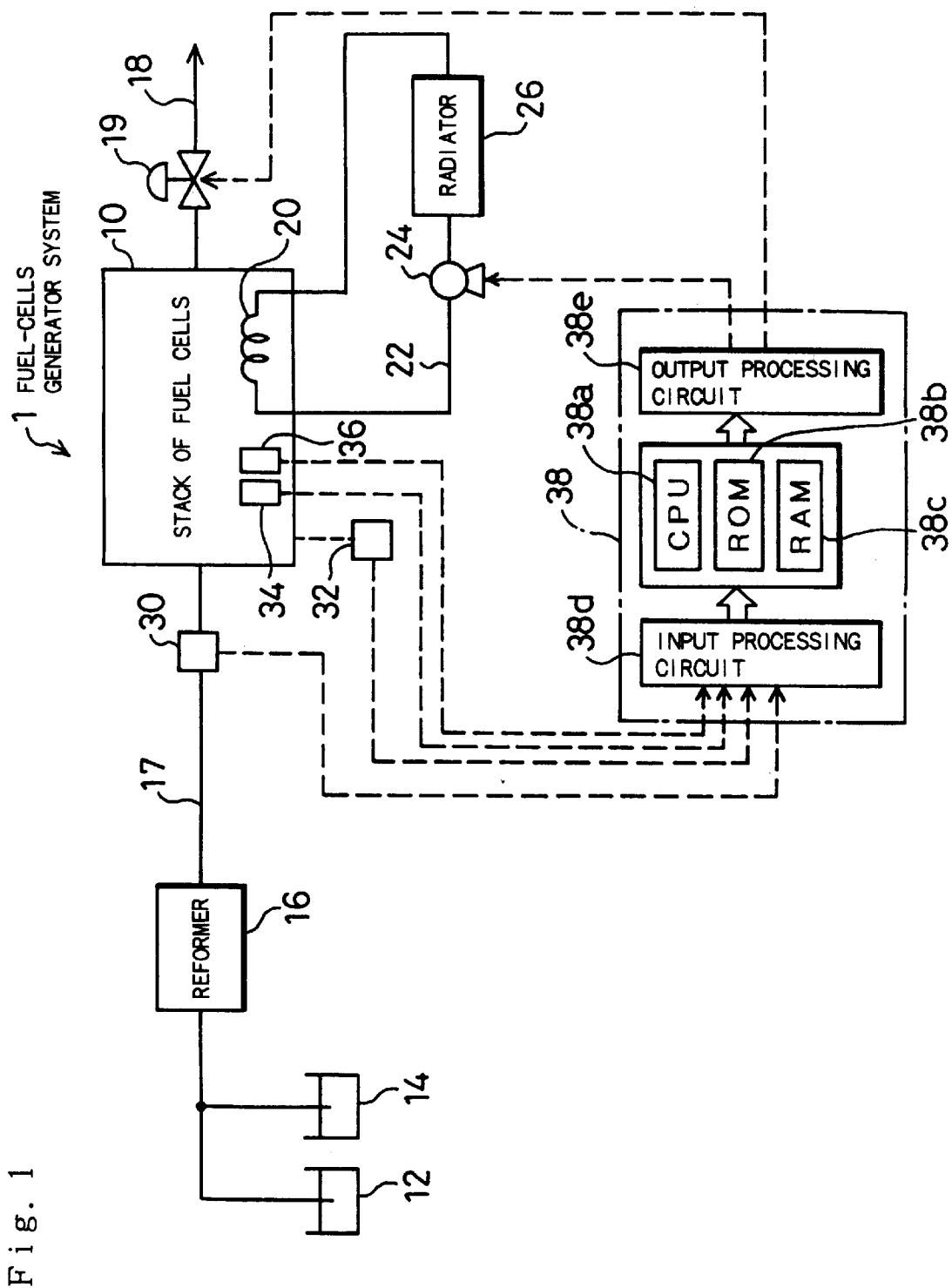
FIG. 1 is a block diagram schematically illustrating structure of a fuel-cells generator system 1 as a first embodiment according to the present invention.

FIG. 1 is a block diagram schematically illustrating structure of a fuel-cells generator system 1 as a first embodiment according to the present invention. The fuel-cells generator system 1 includes a stack of polymer electrolyte fuel cells 10 for generating electricity, a reformer 16 for receiving supplies of methanol and water fed from a methanol tank 12 and a water tank 14 and producing a hydrogen-rich gas, a gaseous fuel supply conduit 17 for feeding the hydrogen-rich gas produced by the reformer 16 as a gaseous fuel to the stack of fuel cells 10, a gaseous fuel discharge conduit 18 for making the gaseous fuel discharged from the stack of fuel cells 10 flown outside, and a back-pressure regulating valve 19 for regulating the opening of the gaseous fuel discharge conduit 18.

The fuel-cells generator system 1 further includes a circulation path 22 for circulating the cooling water through a cooling plate 20 built in the stack of fuel cells 10 as well as a cooling water pump 24 and a radiator 26 disposed in the circulation path 22.

There are a variety of sensors for detecting the operating conditions of the fuel cells. Such sensors include a carbon monoxide sensor 30 disposed in the middle of the gaseous fuel discharge conduit 18 for measuring the concentration of carbon monoxide included in the gaseous fuel, a voltmeter 32 for measuring the voltage of electric signals output from the stack of fuel cells 10, a temperature sensor 34 consisting of thermocouples for measuring the temperature of the unit cell in the stack of fuel cells 10, and a pressure sensor 36 for measuring the pressure of the gaseous fuel. The fuel-cells generator system 1 also has an electronic control unit 38 that is electrically connected with such sensors and carries out a variety of control operations.

The following describes structure of the stack of fuel cells 10. The stack of fuel cells 10 consists of polymer electrolyte fuel cells as mentioned above, and each unit cell has the structure shown in FIG. 2. Each unit cell has an electrolyte membrane 41, an anode 42 and a cathode 43, which are gas diffusion electrodes arranged across the electrolyte membrane 41 to construct a sandwich-like structure 40, separators 44 and 45, which are disposed outside the sandwich-like structure 40 and respectively connected to the anode 42 and the cathode 43 to form flow paths of gaseous fuel and oxygen-containing gas, and collector plates 46 and 47, which are disposed further outside the separators 44 and 45 and function as current collectors of the anode 42 and the cathode 43.

The electrolyte membrane 41 is an ion-exchange membrane composed of a polymer material, such as a fluororesin, and shows favorable electrical conductivity in the wet state. The anode 42 and the cathode 43 are made of carbon paper, carbon sheet, or carbon cloth, wherein carbon powder with a platinum catalyst carried thereon is incorporated in the interstices of the carbon paper, carbon sheet, or carbon cloth.

The separators 44 and 45 are composed of a dense carbon plate. The separator 44 has a plurality of ribs that are combined with the surface of the anode 42 to define flow paths 44P of gaseous fuel, whereas the separator 45 has a plurality of ribs that are combined with the surface of the cathode 43 to define flow paths 45P of oxygen-containing gas. The collector plates 46 and 47 are made of a good conductor of electricity, such as copper (Cu).

Figure 3:
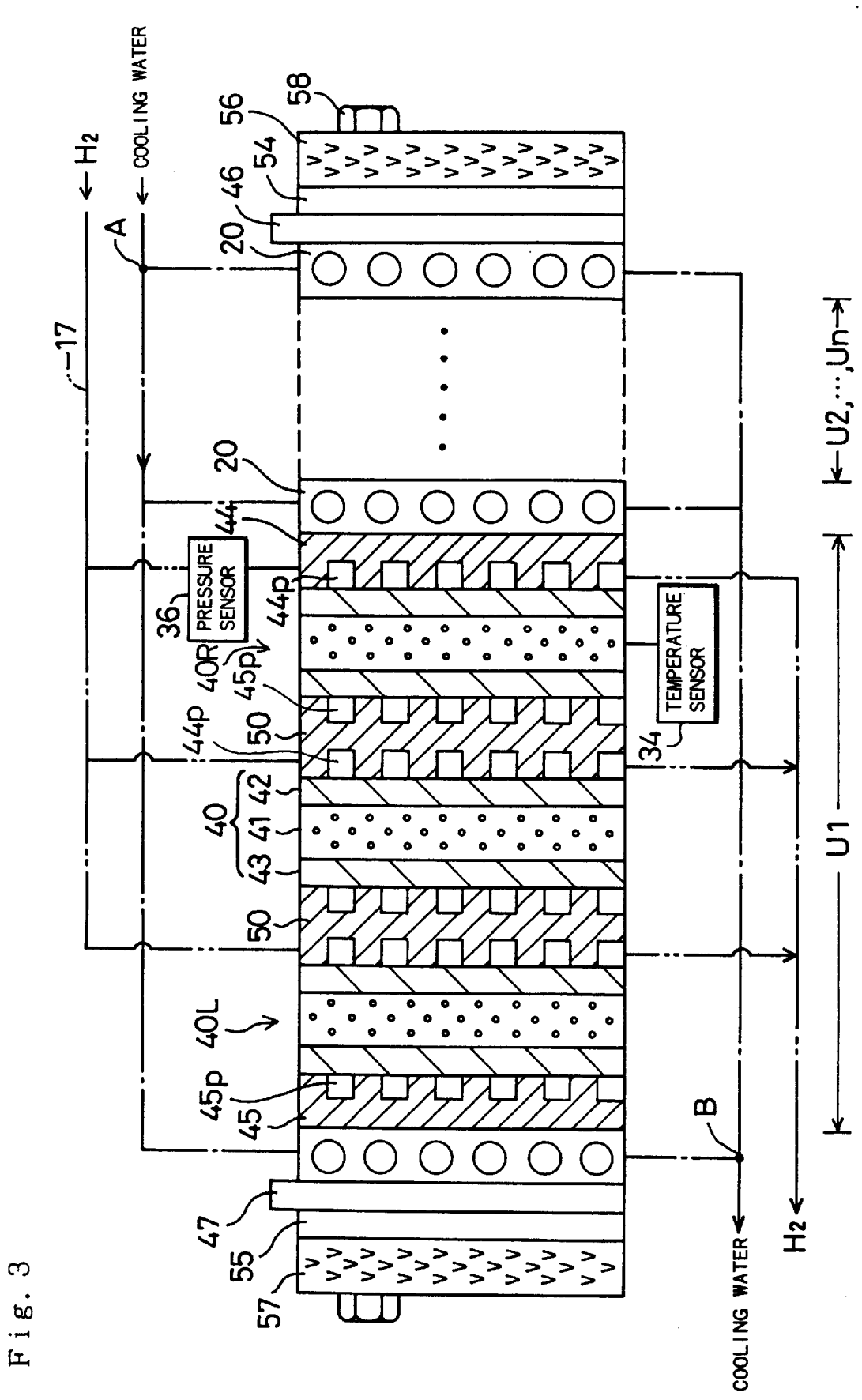
FIG. 3 illustrates a general structure of the stack of fuel cells 10.

The stack of fuel cells 10 is obtained by laying a plurality of such unit cells discussed above one upon another. FIG. 3 shows the general structure of the stack of fuel cells 10.

The stack of fuel cells 10 is a collection of a plurality of stack units U1 through Un (n is an integer of not smaller than 2 and, for example, equal to 100). One stack unit U1 is clearly shown in FIG. 3. The stack unit U1 is obtained by laying a plurality of (three in this example) the sandwich-like structures 40 including the electrolyte membrane 41, the anode 42, and the cathode 43 (see FIG. 2) one upon another via 25 separators 50 (and the separators 44 and 45 shown in FIG. 2).

Figure 2:
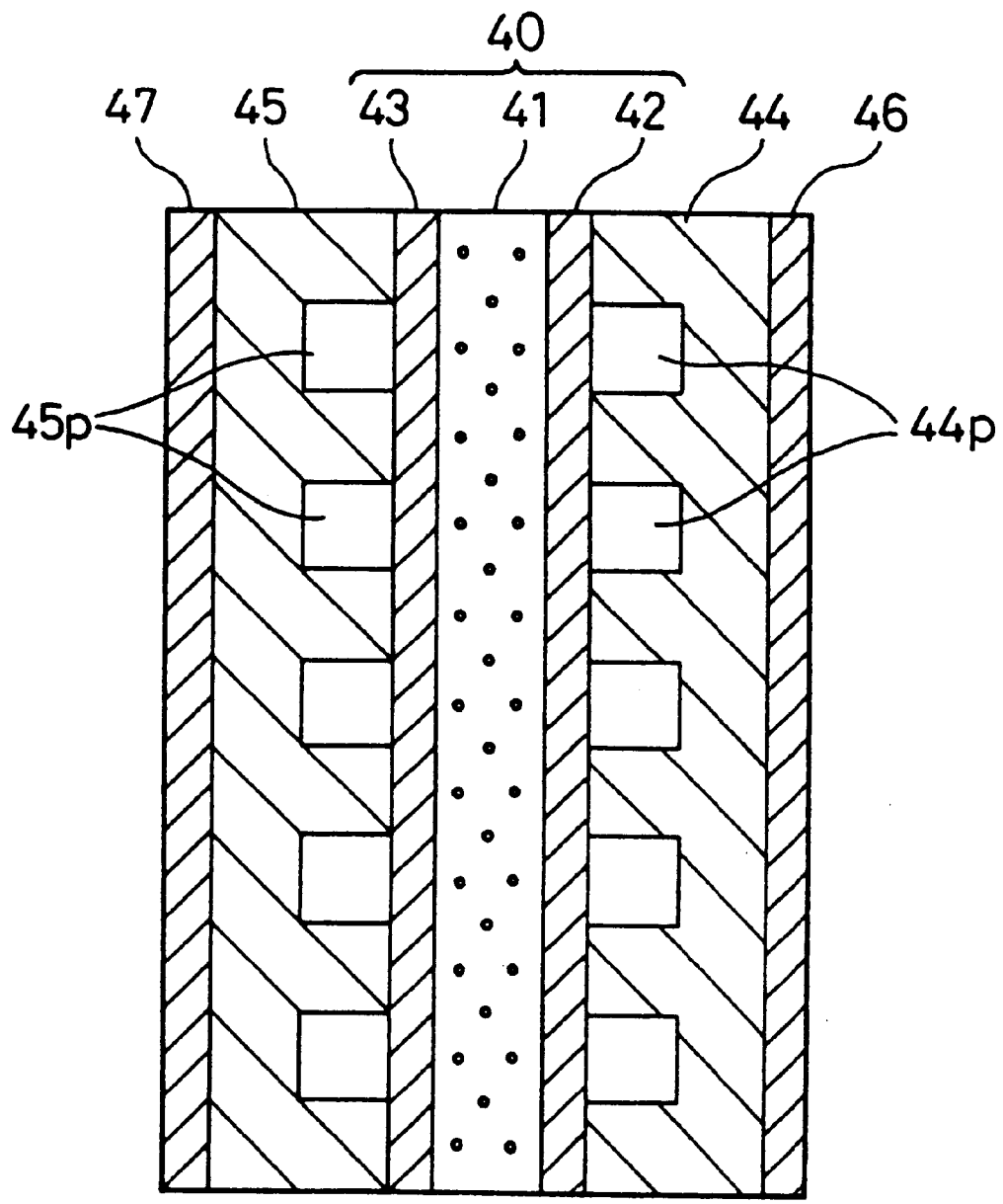
FIG. 2 illustrates a unit cell structure of a stack of fuel cells 10.

The separators 50 are composed of the same material as that of the separators 44 and 45 of the unit cell shown in FIG. 2. Each separator 50 comes into contact with the anode 42 to define flow paths of gaseous fuel 44$p$ and comes into contact with the cathode 43 to define flow paths of oxygen-containing gas 45$p$. In the stack unit U1, the separator 44 (shown in FIG. 2) for defining only the flow paths of gaseous fuel 44$p$ is disposed outside a right-most sandwich-like structure 40R, whereas the separator 45 (shown in FIG. 2) for defining only the flow paths of oxygen-containing gas 45$p$ is disposed outside a left-most sandwich-like structure 40L.

The other stack units U2 through Un have the same structure as that of the stack unit U1 discussed above. These n stack units U1 through Un are connected in series via the cooling plates 20 described above with the drawing of FIG. 1. The cooling plates 20 are also disposed outside the both ends of the n stack units U1 through Un, and the collector plates 46 and 47 (discussed above) are further disposed outside the cooling plates 20. The whole structure is interposed between end plates 56 and 57 via insulating plates 54 and 55 and clamped with a clamping bolts 58.

Each cooling plate 20 has internal flow paths, through which the cooling water flows. Point A in the vicinity of a junction of flow paths connected to one sides of the respective cooling plates 20 and Point B in the vicinity of another junction of flow paths connected to the other sides of the respective cooling plates 20 are joined with the circulation path 22 (see FIG. 1), in order to constitute a cooling water system.

The inlets of the flow paths of gaseous fuel 44$p$ in the respective unit cells included in the stack of fuel cells 10 are connected to the gaseous fuel supply conduit 17 via a manifold (shown by the two-dot chain line in FIG. 3). The outlets of the flow paths of gaseous fuel 44$p$ in the respective unit cells included in the stack of fuel cells 10 are connected to the gaseous fuel discharge conduit 18 via a manifold (shown by the two-dot chain line in FIG. 3).

The pressure sensor 36 is arranged in a flow path connecting with the flow paths of gaseous fuel 44$p$ in a predetermined unit cell of the stack unit U1, whereas the temperature sensor 34 is also connected to the predetermined unit cell.

Figure 4:
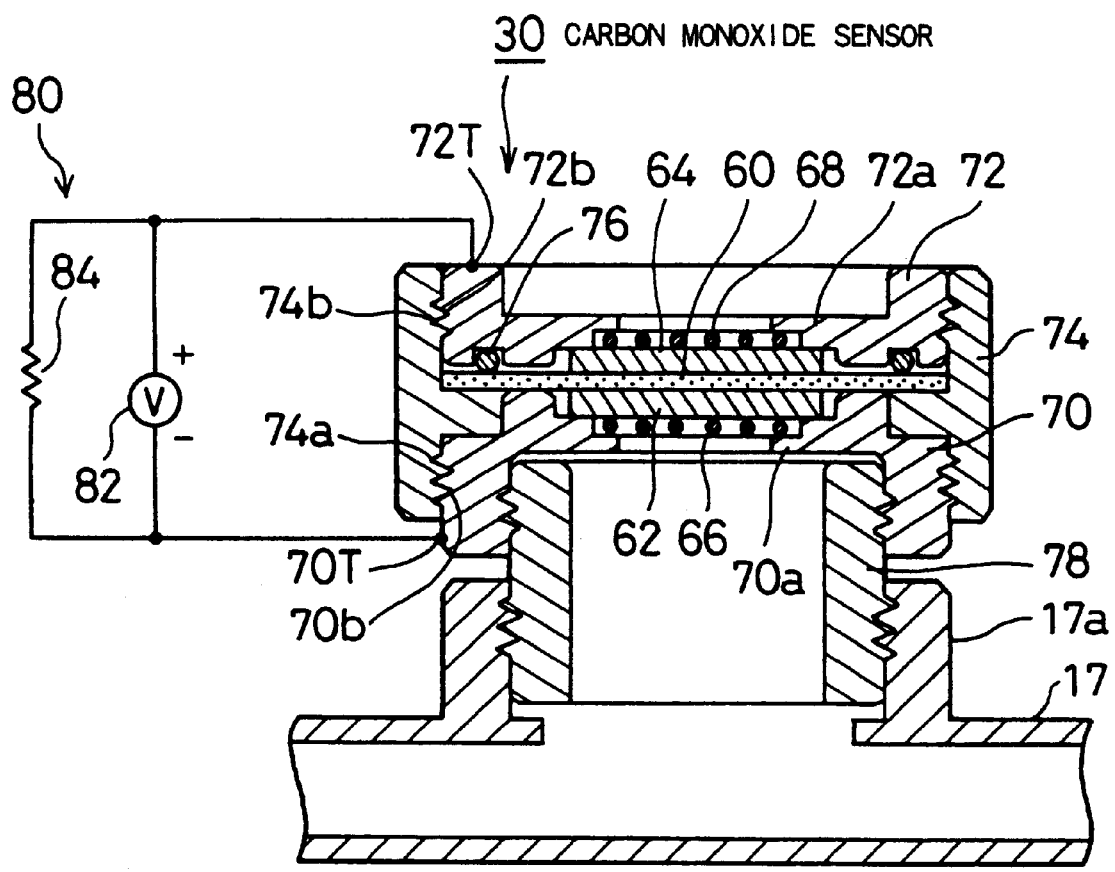
FIG. 4 is a vertical sectional view illustrating a carbon monoxide sensor 30.

The following describes structure of the carbon monoxide sensor 30, based on the vertical sectional view of FIG. 4. The carbon monoxide sensor 30 includes an electrolyte membrane 60, two electrodes 62 and 64 arranged across the electrolyte membrane 60 to constitute a sandwich-like structure, two meshed metal plates 66 and 68 arranged across the sandwich-like structure for preventing deflection of the sandwich-like structure, two holders 70 and 72 for fixing the sandwich-like structure and the metal plates 66 and 68, and an insulating member 74 for coupling the holders 70 and 72 with each other in an electrically insulating state.

The electrolyte membrane 60 is a proton-conductive membrane composed of a polymer electrolyte material, such as a fluororesin. The electrodes 62 and 64 are made of an electrode base material, such as carbon paper, carbon sheet, or carbon cloth, wherein carbon powder with a platinum catalyst carried thereon is incorporated in the interstices of the electrode base material. The electrolyte membrane 60 is joined with the electrodes 62 and 64 according to any one of the following methods:

(1) applying a catalytic powder, which has been coated in advance by making platinum carried on the surface of carbon powder, onto the surface of the electrode bases (carbon cloth or carbon paper), and integrating the electrolyte membrane 60 with the electrode bases by hot pressing;

(2) applying a catalytic powder, which has been coated in advance by making platinum carried on the surface of carbon powder, onto the surface of the electrode bases, and bonding the electrolyte membrane 60 to the electrode bases via a proton-conductive polymer electrolyte solution; and (3) dispersing a catalytic powder, which has been coated in advance by making platinum carried on the surface of carbon powder, in an appropriate organic solvent to a paste, applying the paste onto the surface of the electrolyte membrane 60 by, for example, screen printing, and integrating the electrolyte membrane 60 with the electrode bases by hot pressing.

The carbon powder with the platinum catalyst carried thereon is prepared in the following manner. An aqueous solution of chloroplatinic acid is mixed with sodium thiosulfate to yield an aqueous solution of platinum sulfite complex. Hydrogen peroxide is added dropwise to the aqueous solution of platinum sulfite complex with stirring, so that platinum colloidal particles are deposited in the aqueous solution. Carbon black functioning as a carrier is then added to the aqueous solution with stirring, so that the platinum colloidal particles adhere to the surface of carbon black. Examples of available carbon black include VULCAN XC-72 (trade name by CABOT Corp., the USA) and DENKA BLACK (trade name by DENKI KAGAKU KOGYO K. K.) The carbon black with platinum particles adhering thereto is separated by filtration under reduced pressure or by pressure filtration of the aqueous solution, washed repeatedly with deionized water, and completely dried at room temperature. The dried carbon black aggregate is ground with a grinder and heated in a reducing hydrogen atmosphere at 250° C. through 350° C. for approximately 2 hours, with a view to reducing platinum on the carbon black and completely removing the remaining chlorine.

The catalytic powder incorporated in the electrodes 42 and 43 of the stack of fuel cells 10 is also prepared in the above manner.

The meshed metal plates 66 and 68 have the structure that enables gases to be flown into the electrodes 62 and 64. Preferable material for the meshed metal plates 66 and 68 has excellent electrical conductivity and good rust preventing properties and does not cause hydrogen brittleness; for example, titanium and stainless steel. As another example, the metal plates 66 and 68 may be meshed copper plates having the surface coated with (for example, plated with) a metal, such as gold, platinum, or titanium. As long as the required properties including excellent electrical conductivity are satisfied, porous carbon plates, foamed nickel plates, and engineering plastics having the surface coated with (for example, plated with) a metal, such as gold, platinum, or titanium, may also be applicable as the metal plates 66 and 68.

The holders 70 and 72 respectively have flanges 70a and 72a projected inward from the cylindrical holder structures 70 and 72. The electrolyte membrane 60, the pair of electrodes 62 and 64, and the meshed metal plates 66 and 68 are supported by these flanges 70a and 72a of the holders 70 and 72. Preferable material for the holders 70 and 72 has excellent electrical conductivity and good rust preventing properties and does not cause hydrogen brittleness; for example, titanium and stainless steel. As another example, the holders 70 and 72 may be copper plates having the surface coated with (for example, plated with) a metal, such as gold, platinum, or titanium. As long as the required properties including excellent electrical conductivity are satisfied, dense carbon plates and engineering plastics having the surface coated with (for example, plated with) a metal, such as gold, platinum, or titanium, may also be applicable as the holders 70 and 72.

The holder 72 is provided with an O-ring 76, which comes into contact with the electrolyte membrane 60 and prevents an atmosphere of one electrode from leaking to the other electrode. Another structure of ensuring the sealing properties may also be applicable instead of the O-ring 76; for example, an end portion of the electrolyte membrane 60 is bonded to the holder 72 with an adhesive or by means of thermal contact bonding.

The holders 70 and 72 respectively have, on the circumference thereof, outer screw threads 70b and 72b, which mate and engage with inner screw threads 74a and 74b formed inside the insulating member 74. Engagement of the mating screw threads 70b,72b and 74a,74b enables the holders 70 and 72 to connect with each other and securely support the sandwich structure of electrode 62-electrolyte membrane 60-electrode 64 placed therebetween. Preferable material for the insulating member 74 is, for example, polytetrafluoroeythylene (trade name: TEFLON).

The carbon monoxide sensor 30 further includes a gas in-flow conduit 78 that is joined with one holder 70 via mating screw threads. The gas in-flow conduit 78 leads a gaseous fuel or an object gas to be detected into the electrode 62, and is composed of an insulating material. The other holder 72 does not connect with any specific gas conduit, but the electrode 64 is exposed to the atmosphere.

The carbon monoxide sensor 30 is also provided with a circuit 80, which electrically connects detection terminals 70T and 72T of the holders 70 and 72 with each other. The circuit 80 includes a voltmeter 82 and a resistor 84 for adjusting the load current, which are arranged in parallel between the detection terminals 70T and 72T. Connection of the voltmeter 82 is determined to give negative polarity to the detection terminal 70T of the holder 70 on the side of the electrode 62 exposed to the gaseous fuel and positive polarity to the detection terminal 72T of the holder 72 on the side of the electrode 64 exposed to the atmosphere. Signals of the voltmeter 82 are output to an external control system.

The carbon monoxide sensor 30 thus constructed is linked with a branched opening 17a of the gaseous fuel supply conduit 17 via mating screw threads. The carbon monoxide sensor 30 is used to measure the concentration of carbon monoxide (CO) included in a supply of gaseous fuel fed to the fuel cells (not shown in FIG. 4).

The following description regards the process of measuring carbon monoxide included in the hydrogen-rich gas (that is, the gaseous fuel or the object gas to be detected) with the carbon monoxide sensor 30. A supply of gaseous hydrogen included in the hydrogen-rich gas is fed to the electrode 62 of the carbon monoxide sensor 30, while a supply of oxygen included in the atmosphere is fed to the electrode 64. Reactions expressed by Equations (1) and (2) given below accordingly proceed on the surface of the electrodes 62 and 64 across the electrolyte membrane 60:

$$H_2 \rightarrow 2H^+ + 2e^- \qquad (1)$$

$$2H^+ + 2e^- + (\tfrac{1}{2})O_2 \rightarrow H_2O \qquad (2)$$

These reactions are identical with those proceeding in the fuel cells, which receive hydrogen and oxygen as fuels and generate electrical energy. An electromotive force is thus generated between the electrodes 62 and 64. Since the resistor 84 is connected between the electrodes 62 and 64 in this embodiment, the voltmeter 82 measures the potential difference between the electrodes 62 and 64 when a predetermined electric current is flown through the circuit under a predetermined loading connected between the electrodes 62 and 64. The potential difference decreases with an increase in concentration of carbon monoxide included in the object gas. This phenomenon is ascribed to the following reasons.

The reaction expressed by Equation (1) given above proceeds on the electrode 62, in which the carbon powder having the platinum catalyst carried thereon is incorporated. Carbon monoxide existing in the object gas is adsorbed by the catalyst and interferes with the catalytic action; namely, carbon monoxide poisons the catalyst. The degree of poisoning is large for the high concentration of carbon monoxide included in the object gas and small for the low concentration of carbon monoxide. The potential difference between the detection terminals 70T and 72T is measured, while the reactions expressed by Equations (1) and (2) continuously proceed on the electrodes 62 and 64. In this state, the potential difference reflects the concentration of carbon monoxide included in the object gas, and the measurement of potential difference determines the concentration of carbon monoxide included in the object gas. Connection of one detection terminal 70T with the other detection terminal 72T via the resistor 84 enables the reactions of Equations (1) and (2) to continuously proceed on the electrodes 62 and 64. Under such conditions, the potential difference is measured between the detection terminals 70T and 72T.

Figure 5:
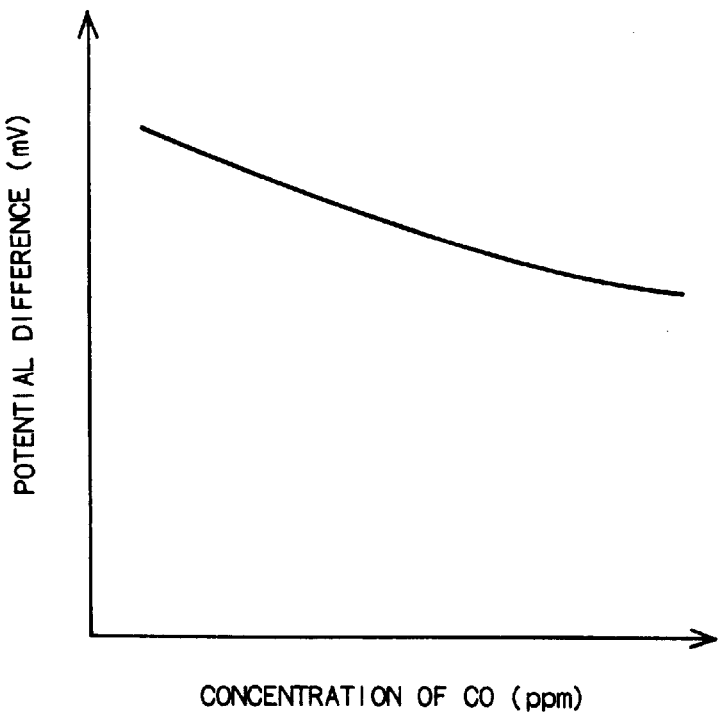
FIG. 5 is a graph showing the potential difference plotted against the concentration of carbon monoxide included in the object gas measured by the carbon monoxide sensor 30.

The relationship between the concentration of carbon monoxide and the measurement of the voltmeter 82 is determined previously with gases containing known concentrations of carbon monoxide. The concentration of carbon monoxide included in the object gas is then determined according to this relationship. In accordance with a concrete procedure, a map B representing the relationship between the concentration of carbon monoxide included in the object gas and the potential difference measured by the voltmeter 82, for example, a map shown in FIG. 5, is stored in advance in a ROM of the electronic control unit 38 (see FIG. 1). The electronic control unit 38 refers to the map B and executes arithmetic and logic operations to determine the concentration of carbon monoxide. The existence of hydrogen does not affect the sensitivity of detection in the measurement of the concentration of carbon monoxide. The concentration of carbon monoxide included even in the hydrogen-rich object gas or the gaseous fuel supplied to the fuel cells can thus be determined with high precision.

Referring back to FIG. 1, the electronic control unit 38 is constructed as a microcomputer-based, arithmetic and logic circuit. The electronic control unit 38 includes a CPU 38a that executes predetermined arithmetic and logic operations according to preset control programs, a ROM 38b, in which control programs and control data required for the arithmetic and logic operations executed by the CPU 38a are stored in advance, a RAM 38c, which a variety of data required for the arithmetic and logic operations executed by the CPU 38a are temporarily written in and read from, an input processing circuit 38d for receiving output signals from the carbon monoxide sensor 30 and the voltmeter 32, and an output processing circuit 38e for outputting control signals to the back-pressure regulating valve 19 based on the results of operations executed by the CPU 38a.

In the drawings of FIGS. 1 through 3, only the system of gaseous fuel on the side of the anode is illustrated, while the system of oxygen-containing gas on the side of the cathode is omitted.

The electronic control unit 38 thus constructed adjusts the position of the back-pressure regulating valve 19 and thereby varies the flow rate of the gaseous fuel flowing through the flow paths 44p in the stack of fuel cells 10, so as to control the output from the stack of fuel cells 10.

Figure 6:
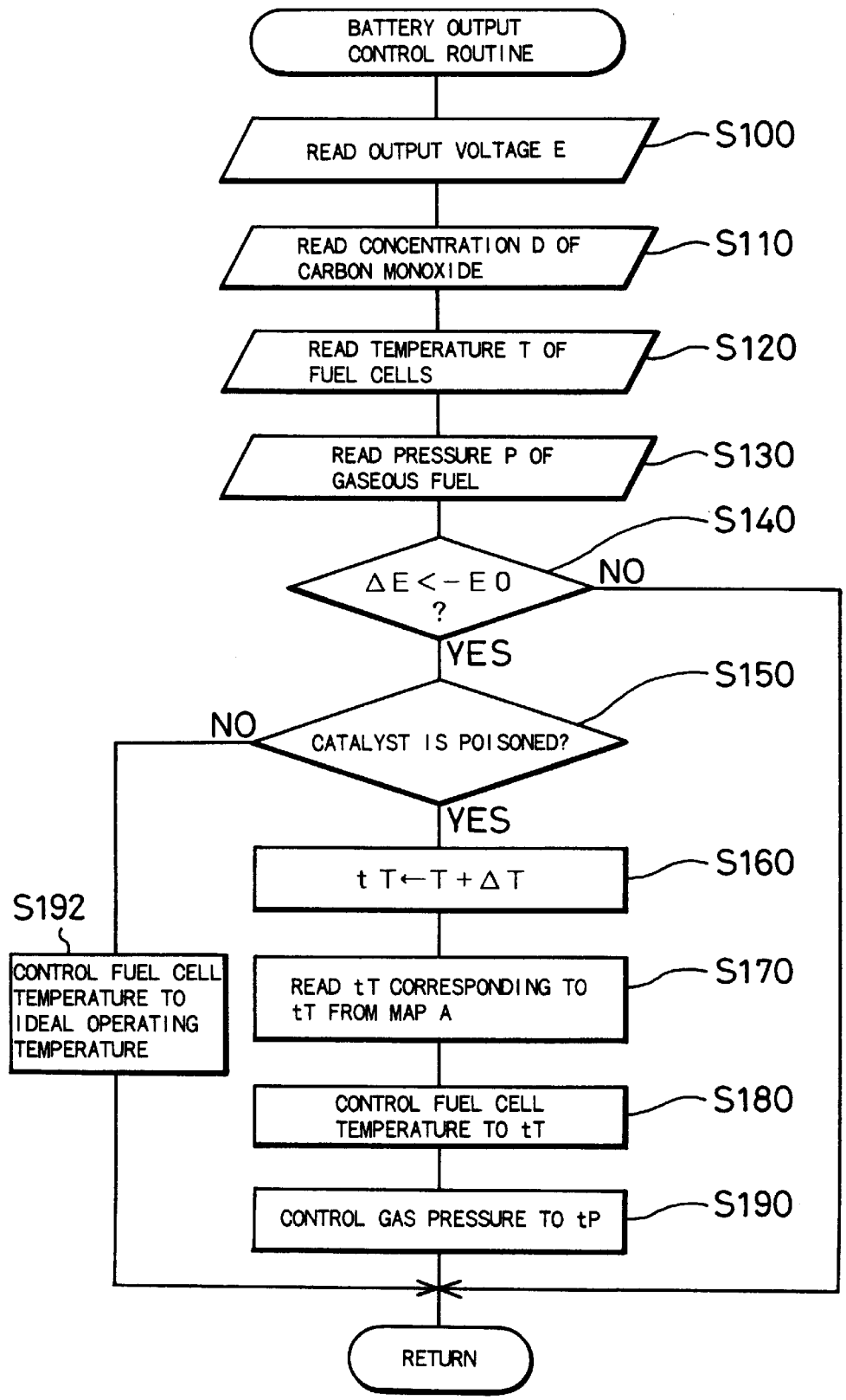
FIG. 6 is a flowchart showing a routine of controlling the battery output executed by the CPU 38a of an electronic control unit 38.

The electronic control unit 38 carries out a routine of controlling the battery output shown in the flowchart of FIG. 6. This control routine is repeatedly executed by the CPU 38a at predetermined time intervals, for example, at every 100 [msec], after the activation of the stack of fuel cells 10. When the program enters the routine of FIG. 6, the CPU 38a first reads an output voltage E of the stack of fuel cells 10 measured by the voltmeter 32 at step S100 and an output voltage of the carbon monoxide sensor 30 as a concentration D of carbon monoxide at step S110. The CPU 38a then reads a temperature T of the predetermined unit cell in the stack of fuel cells 10 (hereinafter referred to as the fuel cell temperature) measured by the temperature sensor 34 at step S120 and a pressure P of the gaseous fuel (hereinafter referred to as the fuel gas pressure) measured by the pressure sensor 36 at step S130.

The CPU 38a subsequently subtracts a past output voltage E' read in a previous cycle of this control routine from the current output voltage E read at step S100 to calculate a difference $\Delta E$, and compares the difference $\Delta E$ with a predetermined voltage $-E0$ ($E0>0$) at step S140. The result of comparison determines whether or not the output voltage E of the fuel cells has been lowered by the amount of change that is not less than the predetermined voltage E0. When the difference $\Delta E$ is not smaller than the predetermined voltage $-E0$ at step S140, that is, when it is determined that the output voltage E of the fuel cells has not been lowered by the amount of change which is not less than the predetermined voltage E0, the program goes to RETURN and exits from this routine.

When the difference $\Delta E$ is smaller than the predetermined voltage $-E0$ at step S140, that is, when it is determined that the output voltage E of the fuel cells has been lowered by the amount of change which is not less than the predetermined voltage E0, on the other hand, the program proceeds to step S150. The CPU 38a compares the concentration D of carbon monoxide read at step S110 with a predetermined concentration D0, in order to determine whether or not the catalyst on the anode 42 is poisoned at step S150.

Figure 7A:
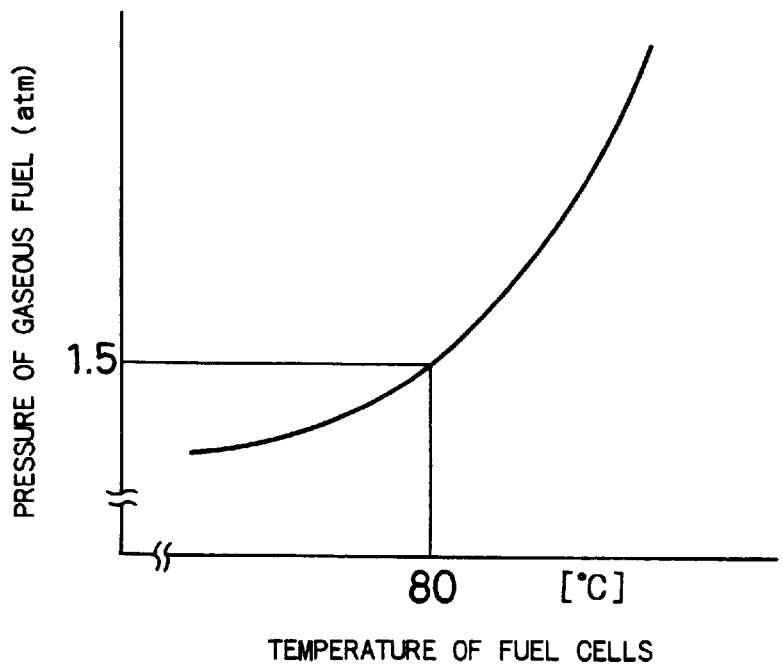
FIG. 7A is a graph showing the pressure of gaseous fuel plotted against the temperature of fuel cells.

When the catalyst is determined to be poisoned at step S150, the CPU 38a adds a predetermined small value $\Delta T$ ($>0$) to the fuel cell temperature Tread at step S120, so as to calculate a target fuel cell temperature tT at step S160. The CPU 38a then reads a target gas pressure tP corresponding to the target fuel cell temperature tT from a map A previously stored in the ROM 38b at step S170. The map A is a curve defined by the fuel cell temperature and the pressure of the gaseous fuel (hereinafter may be referred to as the fuel gas pressure) as shown in FIG. 7A. The fuel cell temperature and the fuel gas pressure are respectively 80° C. and 1.5 atm (152 kPa) in an ideal operating condition of the stack of fuel cells 10. These values are set as standard conditions. The curve that has been experimentally obtained in advance represents the pressure of the gaseous fuel plotted against the fuel cell temperature while the partial vapor pressure of the gaseous fuel under the standard conditions is kept unchanged. At step S170, the CPU 38a refers to the map B and reads the target gas pressure tP of the gaseous fuel that enables the predetermined partial vapor pressure to be kept constant at the target fuel cell temperature tT calculated at step S160.

At subsequent step S180, the CPU 38a raises the actual fuel cell temperature to the target fuel cell temperature tT calculated at step S160. In accordance with a concrete procedure, the CPU 38a drives the cooling water pump 24 in the cooling water system when the actual fuel cell temperature exceeds the target fuel cell temperature tT, and stops the cooling water pump 24 when the actual fuel cell temperature becomes lower than the target fuel cell temperature tT, thereby controlling the actual fuel cell temperature to the target fuel cell temperature tT. The program proceeds to step S190, at which the CPU 38a raises the actual pressure of the gaseous fuel supplied to the anode 42 to the target gas pressure tP obtained at step S170. In accordance with a concrete procedure, the CPU 38a calculates a difference between the current gas pressure P read at step S130 and the target gas pressure tP and regulates the position of the back-pressure regulating valve 19 in the closing direction by an amount corresponding to the calculated difference, thereby controlling the gas pressure P in the gaseous fuel discharge conduit 18 to the target gas pressure tP. Although the processes of steps S180 and S190 are shown as separate steps for the convenience of illustration, these steps are carried out simultaneously in the actual state.

The CPU 38a then goes to RETURN and exits from this routine. As mentioned above, this battery output control routine is repeatedly executed at predetermined time intervals. The repeated execution of steps S180 and S190 enables both the fuel cell temperature and the pressure of the gaseous fuel to increase along the curve shown in the graph of FIG. 7A.

When the catalyst on the anode 42 is determined not to be poisoned at step S150, on the other hand, the CPU 38a controls the fuel cell temperature to the ideal operating temperature, 80° C., at step S192. The program then goes to RETURN and exits from this routine.

Figure 7B:
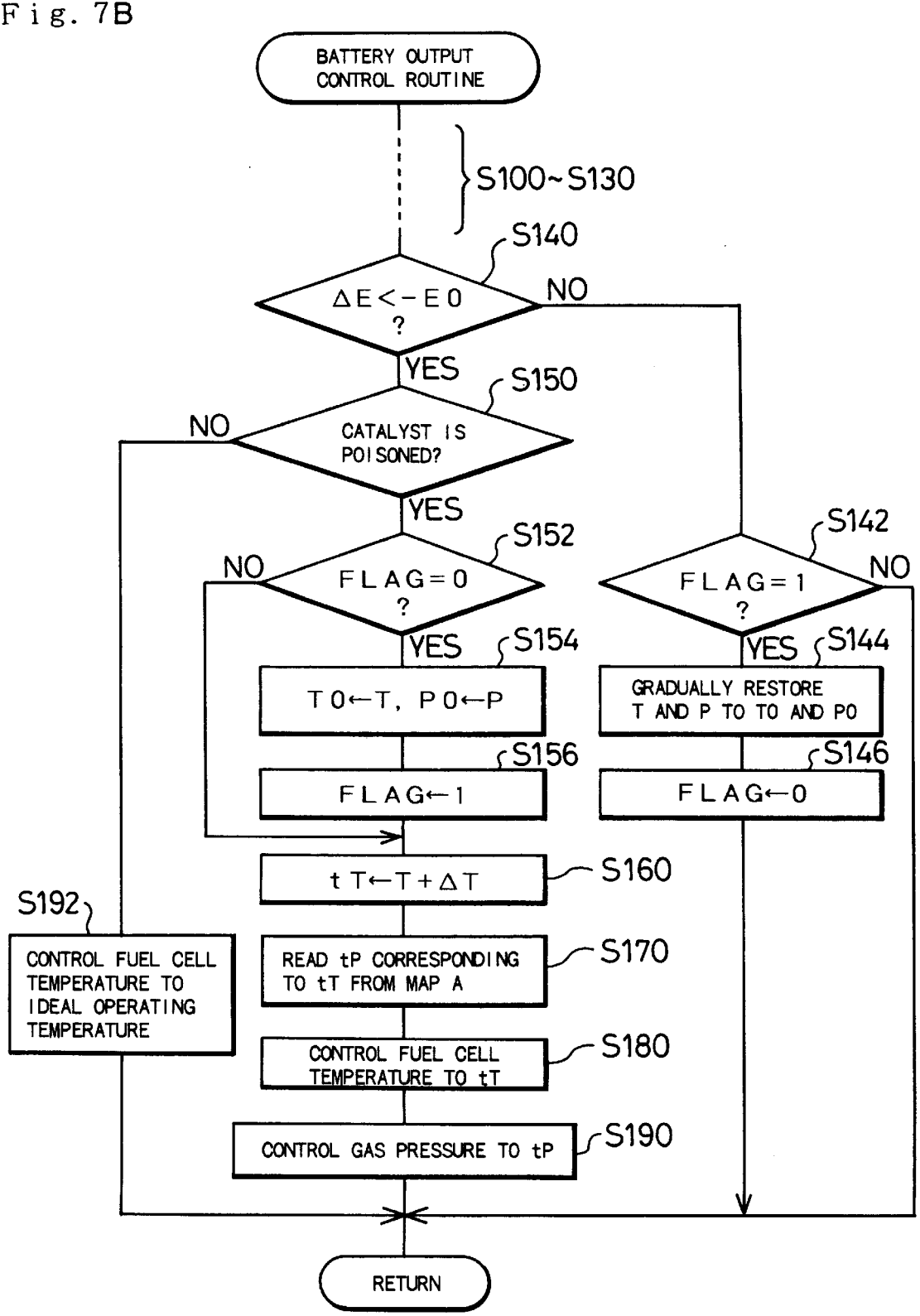
FIG. 7B is a flowchart showing a routine of controlling the battery output, which includes the processing at the time of restoration of the temperature of fuel cells and the pressure of gaseous fuel.

In case that the lowered output voltage E is recovered after the execution of steps S180 and S190, the process gradually decreases the increased fuel cell temperature and the increased fuel gas pressure to the original levels. A concrete structure of this process is shown in the flowchart of FIG. 7B. The same step numbers are allocated to the steps in FIG. 7B that are identical with those in FIG. 6. In case that the answer is affirmative both at steps S140 and S150 after the execution of steps S100 through S130 in FIG. 6, the CPU 38a determines whether or not a flag FLAG is equal to zero at step S152. The flag FLAG is initially set equal to zero, which represents the state immediately after a switch to the affirmative answers at steps S140 and S150. In case that the flag FLAG is equal to zero at step S152, the program determines that the current state is immediately after the switch to the affirmative answers, and stores the fuel cell temperature T and the fuel gas pressure P at the moment into the RAM 38a as a non-controlled fuel cell temperature T0 and a non-controlled fuel gas pressure P0 at step S154. The program then sets the flag FLAG equal to one at step S156 and proceeds to step S160. In case that the flag FLAG is not equal to zero at step S152, on the other hand, the program skips the processing of steps S154 and S156 and directly goes to step S160.

When the answer becomes negative at step S140, the program goes to step S142 to determine whether or not the flag FLAG is equal to one. In case that the flag FLAG is equal to one at step S142, the CPU 38a gradually decreases the fuel cell temperature T and the fuel gas pressure P to the non-controlled fuel cell temperature T0 and the non-controlled fuel gas pressure P0 at step S144. The program subsequently sets the flag FLAG equal to zero at step S146, and goes to RETURN. In case that the flag FLAG is not equal to one at step S142, on the contrary, the program skips the processing of steps S144 and S146 and directly goes to RETURN.

When the lowered output voltage E is recovered through the control operations of the fuel cell temperature and the fuel gas pressure, the battery output control routine shown in the flowchart of FIG. 7B gradually restores the fuel cell temperature T and the fuel gas pressure P to the non-controlled fuel cell temperature T0 and the non-controlled fuel gas pressure P0.

As discussed above, the fuel-cells generator system 1 of the first embodiment gradually increases the fuel cell temperature when the output voltage E of the stack of fuel cells 10 has been lowered by the amount of change that is not less than the predetermined voltage E0 and the catalyst on the anode 42 is poisoned. In this state, the fuel-cells generator system 1 also gradually increases the pressure of the gaseous fuel, in order to keep the partial vapor pressure in the gaseous fuel at a constant level even under the condition of the increased fuel cell temperature.

The control of the fuel cell temperature to the higher values lessens the amount of adsorption of carbon monoxide on the anodes 42 in the fuel cells. Since the partial vapor pressure in the gaseous fuel is kept constant irrespective of the increased fuel cell temperature, hydrogen included in the gaseous fuel can continuously be supplied to the catalyst on the anode 42. When the output voltage E of the stack of fuel cells 10 has been lowered by the amount of change that is not less than the predetermined voltage E0 and the catalyst on the anode 42 is poisoned, the structure of the first embodiment enables the output voltage E to be recovered effectively.

Figure 8:
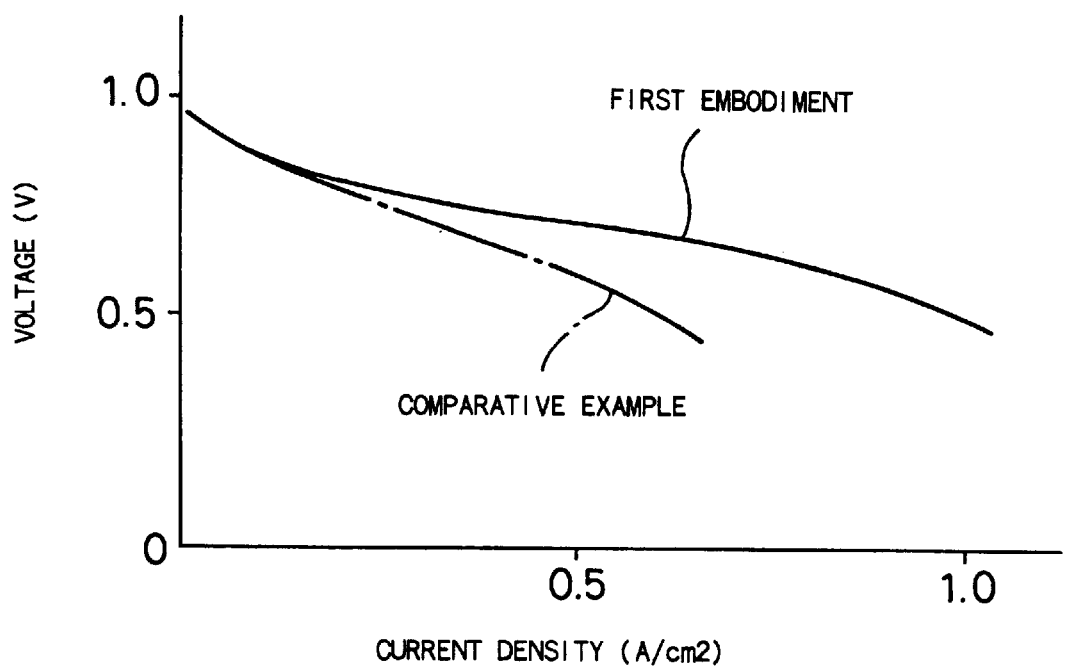
FIG. 8 is a graph showing a current-voltage characteristic curve of the unit cell in the stack of fuel cells 10 of the first embodiment.

The graph of FIG. 8 shows a current-voltage characteristic curve of the unit cell in the stack of fuel cells 10 of the first embodiment. The curve represents an evaluation when the fuel cell temperature is controlled to 100° C. (the gas pressure is also controlled according to the fuel cell temperature) while the concentration of carbon monoxide included in the gaseous fuel is 100 ppm. Compared with the characteristic curve of the fuel cell shown by the one-dot chain line and given as a comparative example, the characteristic curve of the unit cell of the first embodiment shown by the solid line has excellent results over the whole measured range of current density. The comparative example represents a prior art structure that increases only the fuel cell temperature while not controlling the pressure of the gaseous fuel, unlike the first embodiment discussed above. The results of comparison also show that the output voltage E of the stack of fuel cells 10 is recovered effectively when the catalyst is poisoned.

In case that the lowered output voltage E is recovered, the structure of the first embodiment gradually restores the fuel cell temperature and the fuel gas pressure to the original levels. This enables the stack of fuel cells 10 to be operated at a desired output voltage E under the conditions of the original fuel cell temperature and the original fuel gas pressure that are values before the decrease in output voltage E.

Figure 9:
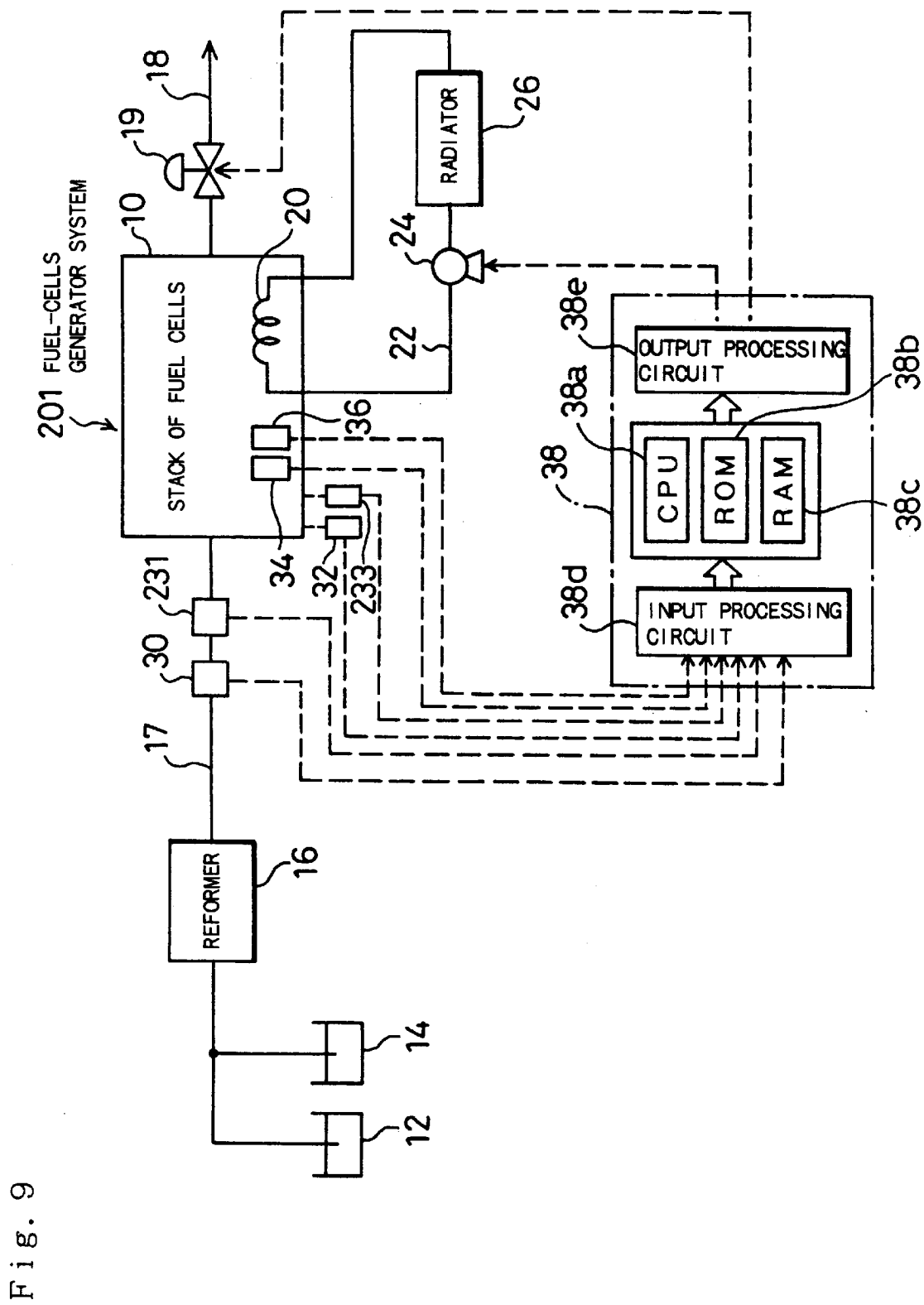
FIG. 9 is a block diagram schematically illustrating structure of a fuel-cells generator system 201 as a second embodiment according to the present invention.

FIG. 9 is a block diagram schematically illustrating structure of another fuel-cells generator system 201 as a second embodiment according to the present invention. The fuel-cells generator system 201 of the second embodiment. has all the constituents included in the fuel-cells generator system 1 of the first embodiment, wherein the like numerals denote the like elements. The fuel-cells generator system 201 further includes a gas flowmeter 231 disposed in the gaseous fuel supply conduit 17 connecting the reformer 16 with the stack of fuel cells 10 for measuring the intake amount of the gaseous fuel to the stack of fuel cells 10 and an ammeter 233 connected to the stack of fuel cells 10 for measuring the output electric current from the stack of fuel cells 10.

The gas flowmeter 231 and the ammeter 233 are connected to the input processing circuit 38d of the electronic control unit 38. The electronic control unit 38 receives detection signals from the various sensors including these sensors 231 and 233 and adjusts the position of the back-pressure regulating valve 19 in response to the input detection signals, thereby varying the flow rate of the gaseous fuel flowing through the flow paths 44p in the stack of fuel cells 10, so as to control the output from the stack of fuel cells 10.

Figure 10:
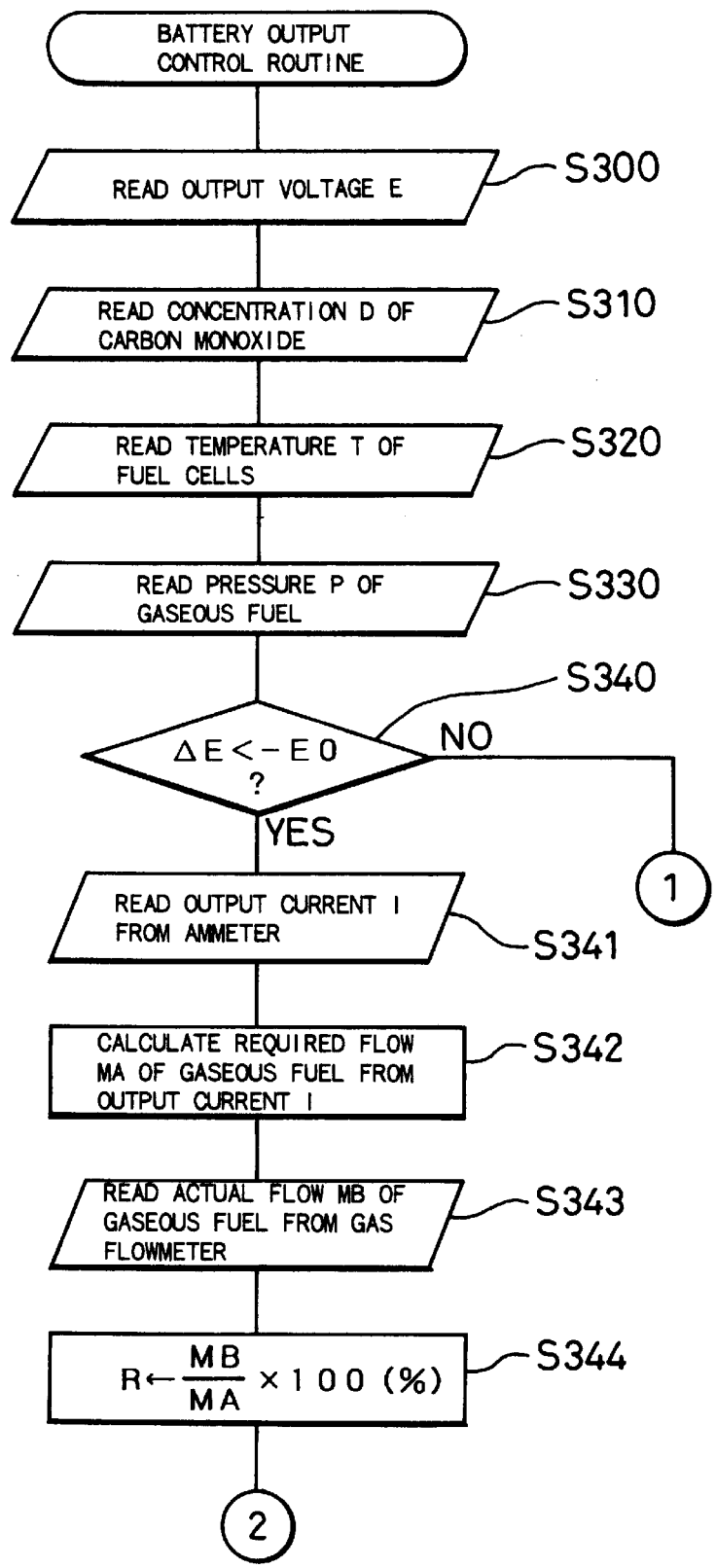
FIGS. 10 and 11 are flowcharts showing a routine of controlling the battery output executed by the CPU in the second embodiment.
Figure 11:
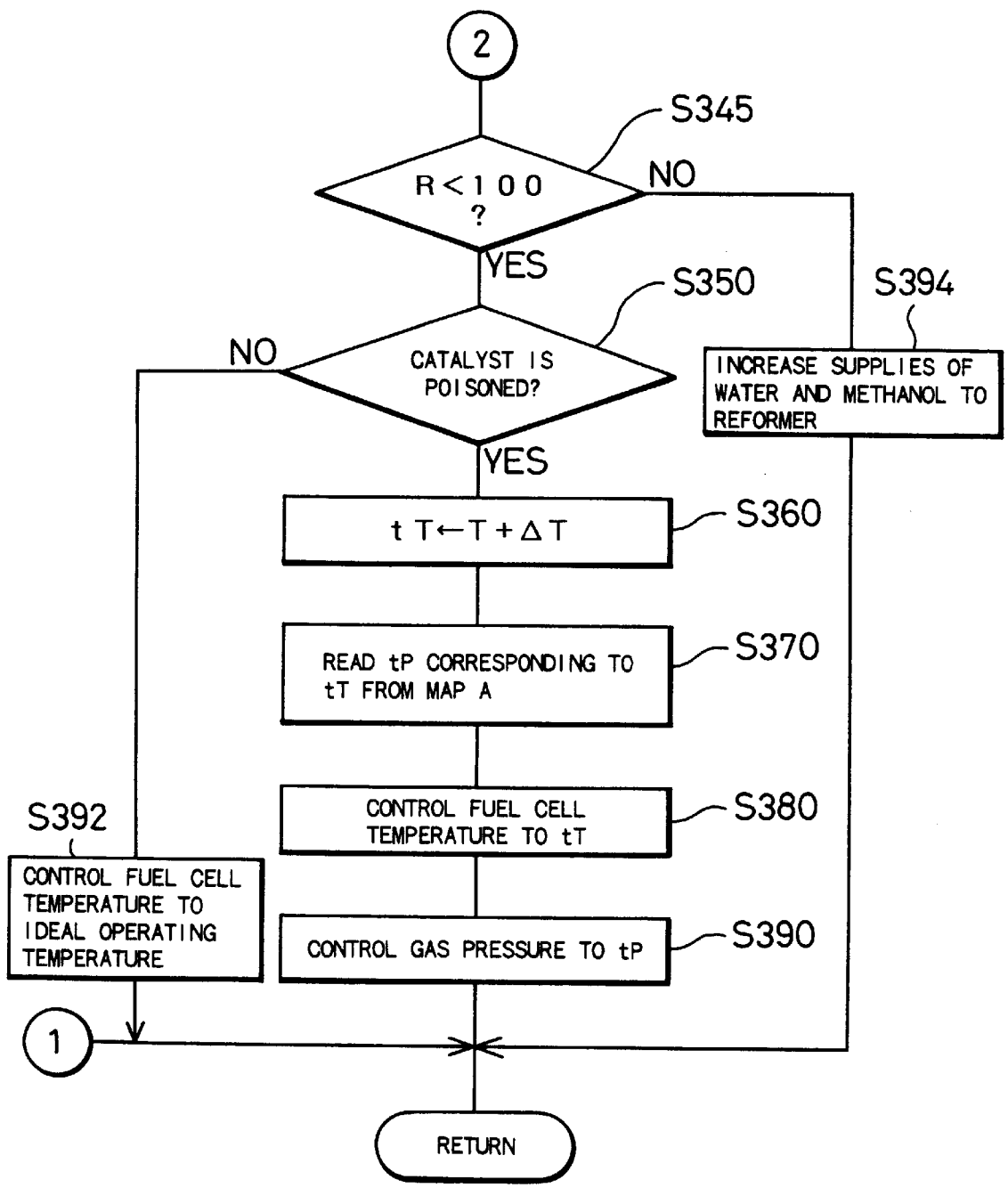

The electronic control unit 38 carries out a routine of controlling the battery output shown in the flowcharts of FIGS. 10 and 11. This control routine is repeatedly executed by the CPU 38a at predetermined time intervals, for example, at every 100 [msec]. When the program enters the routine of FIG. 10, the CPU 38a first executes the processing of steps S300 through S340, which is identical with the processing of steps S100 through S140 in the battery output control routine of the first embodiment shown in the flowchart of FIG. 6.

In case that the answer is negative at step S340, that is, when it is determined that the output voltage E of the fuel cells has not been lowered by the amount of change which is not less than the predetermined voltage E0, the program goes to RETURN and exits from this routine. In case that the answer is affirmative at step S340, that is, when it is determined that the output voltage E of the fuel cells has been lowered by the amount of change which is not less than the predetermined voltage E0, on the contrary, the program carries out the processing discussed below.

The CPU 38a reads an output electric current I from the stack of fuel cells 10 measured by the ammeter 233 at step S341, and calculates a required flow MA of the gaseous fuel, which is theoretically required for the stack of fuel cells 10, from the output electric current I at step S342. The CPU 38a then reads an actual flow MB of the gaseous fuel, which is actually flown into the stack of fuel cells 10 via the gaseous fuel supply conduit 17, from the gas flowmeter 231 at step S343. At subsequent step S344, the CPU 38a calculates a utilization ratio R of the gaseous fuel by dividing the actual flow MB of the gaseous fuel read at step S343 by the required flow MA of the gaseous fuel calculated at step S342 and multiplying the quotient by 100.

The program then goes to step S345 in the flowchart of FIG. 11, at which the CPU 38a determines whether or not the calculated utilization ratio R of the gaseous fuel is less than 100%. In case that the utilization ratio R of the gaseous fuel is less than 100%, the program determines the lowered output of the stack of fuel cells 10 under the condition of a sufficient supply of the gaseous fuel and carries out the processing of steps S350 through S392, which is identical with the processing of steps S150 through S192 in the battery output control routine of the first embodiment.

In case that the answer is negative at step S345, that is, when the utilization ratio R of the gaseous fuel is not less than 100%, the program goes to step S394 to regulate control valves (not shown) and increase the amounts of water and methanol supplied to the reformer 16. The process of step S394 supplements the gaseous fuel and thus lowers the utilization ratio R of the gaseous fuel. The process of step S394 may be replaced by another process that relieves the loading connected to the stack of fuel cells 10 and decreases the output electric current of the stack of fuel cells 10, in order to lower the utilization ratio R of the gaseous fuel.

After any one of steps S390, S392, and S394, the program goes to RETURN and exits from this routine.

In the control routine, it is assumed that the utilization ratio of the oxygen-containing gas supplied to the cathodes 43 in the stack of fuel cells 10 is always less than 100%. In the actual state, however, it is desirable to calculate the utilization ratio of the oxygen-containing gas and determine whether or not both the utilization ratio R of the gaseous fuel and the utilization ratio of the oxygen-containing gas are less than 100% at step S345. In case that either one of the utilization ratios becomes not less than 100%, the corresponding gas should be supplemented without delay.

As discussed above, in case that the output voltage E of the stack of fuel cells 10 has been lowered, the fuel-cells generator system 201 of the second embodiment determines whether or not the gas utilization ratio on the anodes 42 is less than 100%, determines whether or not the catalyst is poisoned only when the gas utilization ratio is less than 100%, and carries out the control of the battery output according to the poisoned state of the catalyst. In case that the gas utilization ratio is not less than 100%, on the contrary, the system does not carry out the control, but immediately increases the amounts of water and methanol supplied to the reformer 16 in order to lower the utilization ratio R of the gaseous fuel. When the gas utilization is not less than 100%, a decrease in battery output, which may be confused with a decrease in output due to the poisoned catalyst by carbon monoxide, is observed. This is because an increase in gas utilization ratio R increases the concentration of carbon monoxide at the gas outlet on the anodes' side even when the concentration of carbon monoxide at the gas inlet on the anodes' side is kept constant.

The fuel-cells generator system 201 realizes highly-precise determination of the poisoned state of the catalyst, based on the various data including the observed gas utilization ratio R. This enables the lowered battery output due to the poisoned catalyst to be recovered with higher accuracy. Under the condition of the high gas utilization ratio R, the system of the second embodiment does not unnecessarily carry out the control of the fuel cell temperature and the fuel gas pressure based on the poisoned state of the catalyst.

Figure 12:
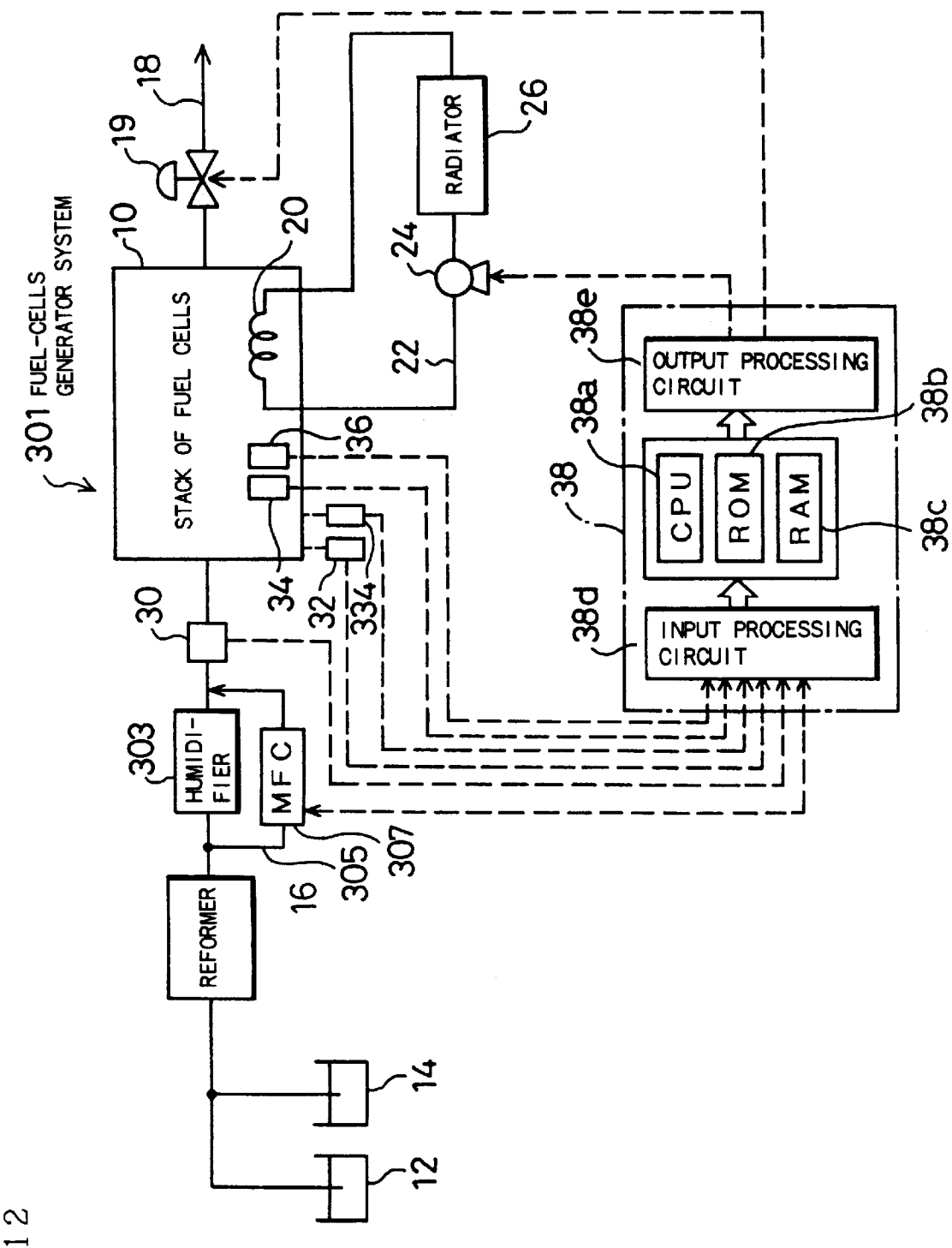
FIG. 12 is a block diagram schematically illustrating structure of a fuel-cells generator system 301 as a third embodiment according to the present invention.

FIG. 12 is a block diagram schematically illustrating structure of still another fuel-cells generator system 301 as a third embodiment according to the present invention. The fuel-cells generator system 301 of the third embodiment has all the constituents included in the fuel-cells generator system 1 of the first embodiment, wherein the like numerals denote the like elements. The fuel-cells generator system 301 further includes a humidifier 303 disposed in the gaseous fuel supply conduit 17 connecting the reformer 16 with the stack of fuel cells 10 for moistening the gaseous fuel supplied to the stack of fuel cells 10, a by-pass line 305 for by-passing the humidifier 303, an MFC (mass flow controller) 307 disposed in the by-pass line 305 for regulating the flow in the by-pass line 305, and an impedance meter 334 for measuring the impedance of the stack of fuel cells 10.

The impedance meter 334 is connected to the input processing circuit 38d of the electronic control unit 38. The electronic control unit 38 receives detection signals from the various sensors including the impedance meter 334 and adjusts the position of the back-pressure regulating valve 19 in response to the input detection signals, thereby varying the flow rate of the gaseous fuel flowing through the flow paths 44p in the stack of fuel cells 10. The electronic control unit 38 also regulates the control flow by the MFC 307, in order to vary the humidity of the gaseous fuel supplied to the stack of fuel cells 10. These regulations result in control of the output from the stack of fuel cells 10.

Figure 13:
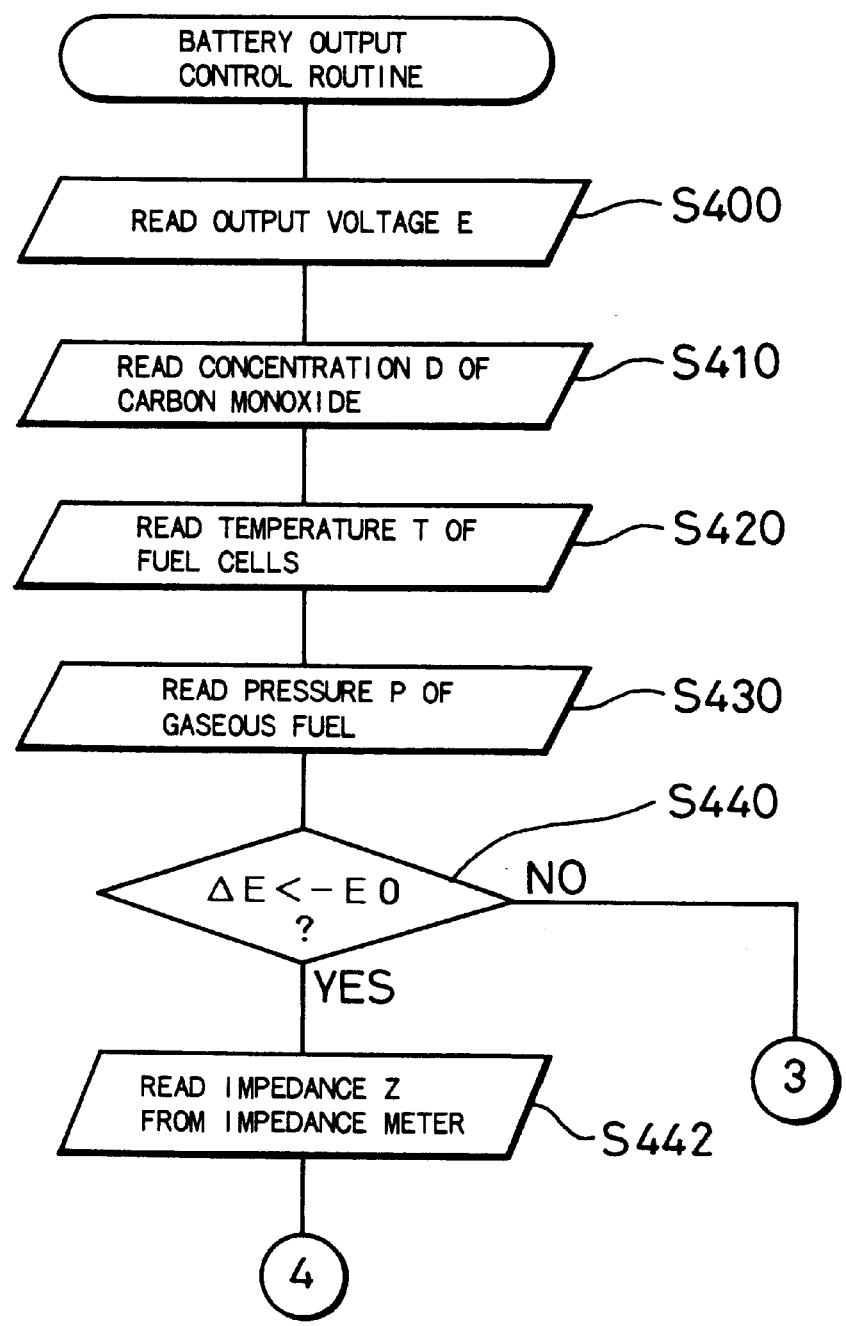
FIGS. 13 and 14 are flowcharts showing a routine of controlling the battery output executed by the CPU in the third embodiment.
Figure 14:
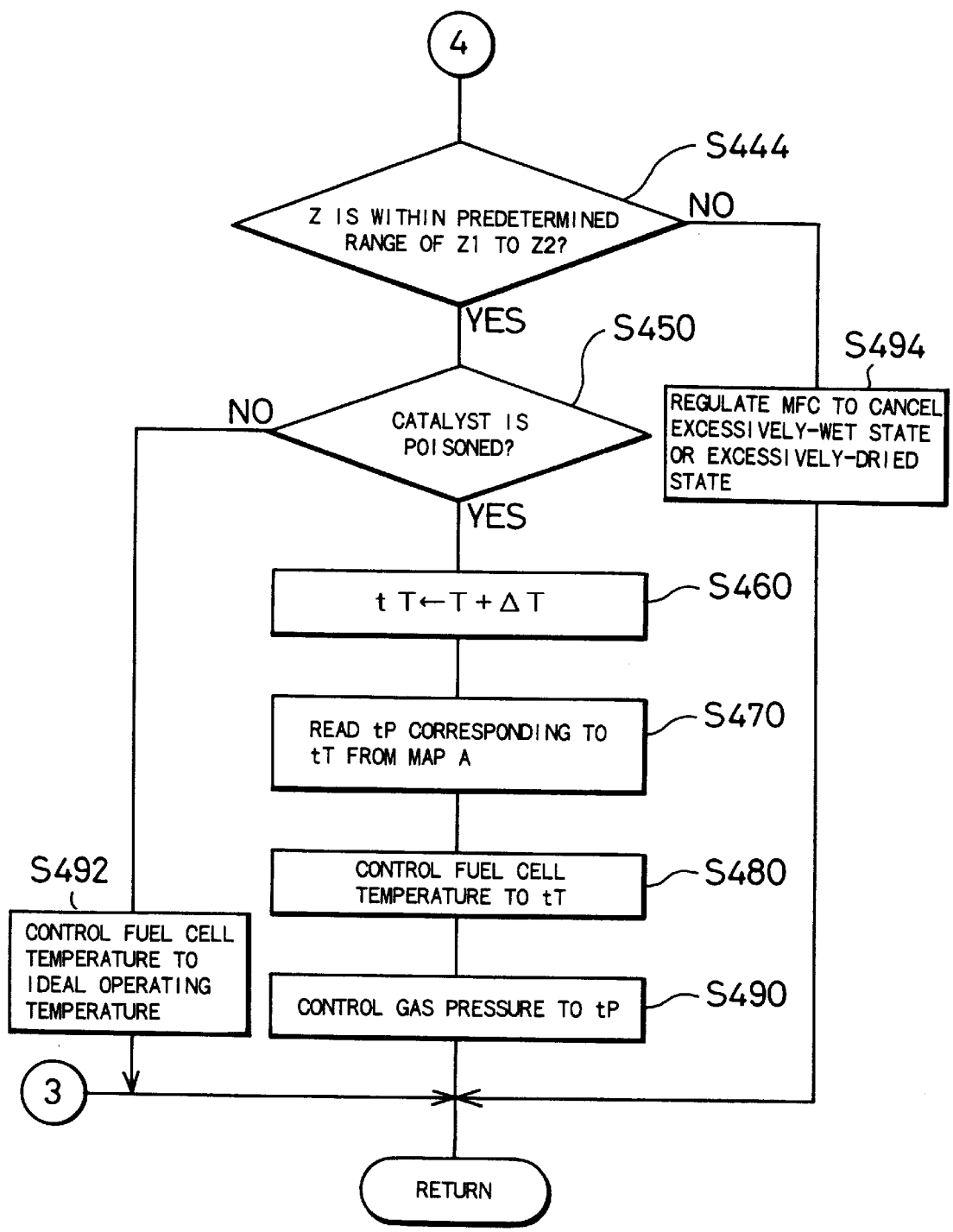

The electronic control unit 38 carries out a routine of controlling the battery output shown in the flowcharts of FIGS. 13 and 14. This control routine is repeatedly executed by the CPU 38a at predetermined time intervals, for example, at every 100 [msec]. When the program enters the routine of FIG. 13, the CPU 38a first executes the processing of steps S400 through S440, which is identical with the processing of steps S100 through S140 in the battery output control routine of the first embodiment shown in the flowchart of FIG. 6.

In case that the answer is negative at step S440, that is, when it is determined that the output voltage E of the fuel cells has not been lowered by the amount of change which is not less than the predetermined voltage E0, the program goes to RETURN and exits from this routine. In case that the answer is affirmative at step S440, that is, when it is determined that the output voltage E of the fuel cells has been lowered by the amount of change which is not less than the predetermined voltage E0, on the contrary, the program carries out the processing discussed below.

The CPU 38a first reads an impedance Z measured by the impedance meter 334 at step S442, and determines whether or not the observed impedance Z is within a range of a predetermined first impedance Z1 to a predetermined second impedance Z2 (>Z1) at step S444 in the flowchart of FIG. 14. This determines whether or not the joint body of the electrolyte membrane 41, the anode 42, and the cathode 43 is neither too wet nor too dried but in the normal state.

When the answer is affirmative at step S444, the program determines the lowered output of the stack of fuel cells 10 under the condition that the joint body of the electrolyte membrane 41, the anode 42, and the cathode 43 is neither too wet nor too dried but in the normal state, and carries out the processing of steps S450 through S492, which is identical with the processing of steps S150 through S192 in the battery output control routine of the first embodiment.

When the answer is negative at step S444, that is, when the observed impedance Z is not within the range of Z1 to Z2, on the other hand, the program goes to step S494. In case that the observed impedance Z is greater than the predetermined second impedance Z2, the CPU 38a outputs a control signal to the MFC 307 in order to decrease the flow of the hydrogen-rich gas in the by-pass line 305 at step S494. This regulation increases the relative ratio of the supply of the humid gas flowing through the humidifier 303 to the total supply of the gas fed to the stack of fuel cells 10, thereby canceling the excessively-dried state of the stack of fuel cells 10. In case that the observed impedance Z is smaller than the predetermined first impedance Z1, on the other hand, the CPU 38a outputs a control signal to the MFC 307 in order to increase the flow of the hydrogen-rich gas in the by-pass line 305 at step S494. This regulation decreases the relative ratio of the supply of the humid gas flowing through the humidifier 303 to the total supply of the gas fed to the stack of fuel cells 10, thereby canceling the excessively-wet state of the stack of fuel cells 10.

Although the excessively-wet state or the excessively-dried state of the stack of fuel cells 10 is cancelled by regulating the MFC 307 at step S494, another possible procedure controls the humidifier 303 (for example, controls the temperature of the humidifier 303), so as to cancel the excessively-wet state or the excessively-dried state of the stack of fuel cells 10.

After any one of steps S490, S492, and S494, the program goes to RETURN and exits from this routine.

As discussed above, in case that the output voltage E of the stack of fuel cells 10 has been lowered, the fuel-cells generator system 301 of the third embodiment determines whether or not the observed impedance Z of the stack of fuel cells 10 is within the predetermined range of Z1 to Z2, determines whether or not the catalyst is poisoned only when the observed impedance Z is within the range of Z1 to Z2, and carries out the control of the battery output according to the poisoned state of the catalyst. In case that the observed impedance Z is out of the predetermined range of Z1 to Z2, the system does not carry out the control, but immediately cancels the excessively-wet state or the excessively-dried state of the joint body of the electrolyte membrane 41, the anode 42, and the cathode 43, in order to make the observed impedance Z within the predetermined range of Z1 to Z2.

When the joint body of the electrolyte membrane 41, the anode 42, and the cathode 43 is either too wet or too dried, a decrease in battery output, which may be confused with a decrease in output due to the poisoned catalyst by carbon monoxide, is observed. The fuel-cells generator system 301 measures the impedance Z of the stack of fuel cells 10, and determines whether or not the joint body of the electrolyte membrane 41 and the electrodes 42 and 43 is either too wet or too dried, based on the observed impedance Z. The system realizes highly-precise determination of the poisoned state of the catalyst, based on the various data including the result of determination regarding the state of the joint body. This enables the lowered battery output due to the poisoned catalyst to be recovered with higher accuracy. While the observed impedance Z is out of the predetermined range of Z1 to Z2, the system of the third embodiment does not unnecessarily carry out the control of the fuel cell temperature and the fuel gas pressure based on the poisoned state of the catalyst.

Although the third embodiment adds the control based on the impedance Z to the structure of the first embodiment, another possible application adds the control based on the impedance Z to the structure of the second embodiment. In the latter structure, the control of the battery output based on th e fuel cell temperature and the fuel gas pressure is prohibited when the gas utilization ratio is not less than 100% or when the impedance Z is out of the predetermined range of Z1 to Z2. In accordance with a concrete procedure, the processing of step S444 of the third embodiment shown in the flowchart of FIG. 14, which determines whether or not the impedance Z is within the predetermined range of Z1 to Z2, is carried out in case that the answer is affirmative at step S345 of the second embodiment shown in the flowchart of FIG. 11. When the answer is negative at step S444, the program carries out the processing of step S494 in the flowchart of FIG. 14. When the answer is affirmative at step S444, on the other hand, the program carries out the processing of step S350 in the flowchart of FIG. 11. This structure enables the lowered battery output due to the poisoned catalyst to be recovered with further high accuracy.

Figure 15:
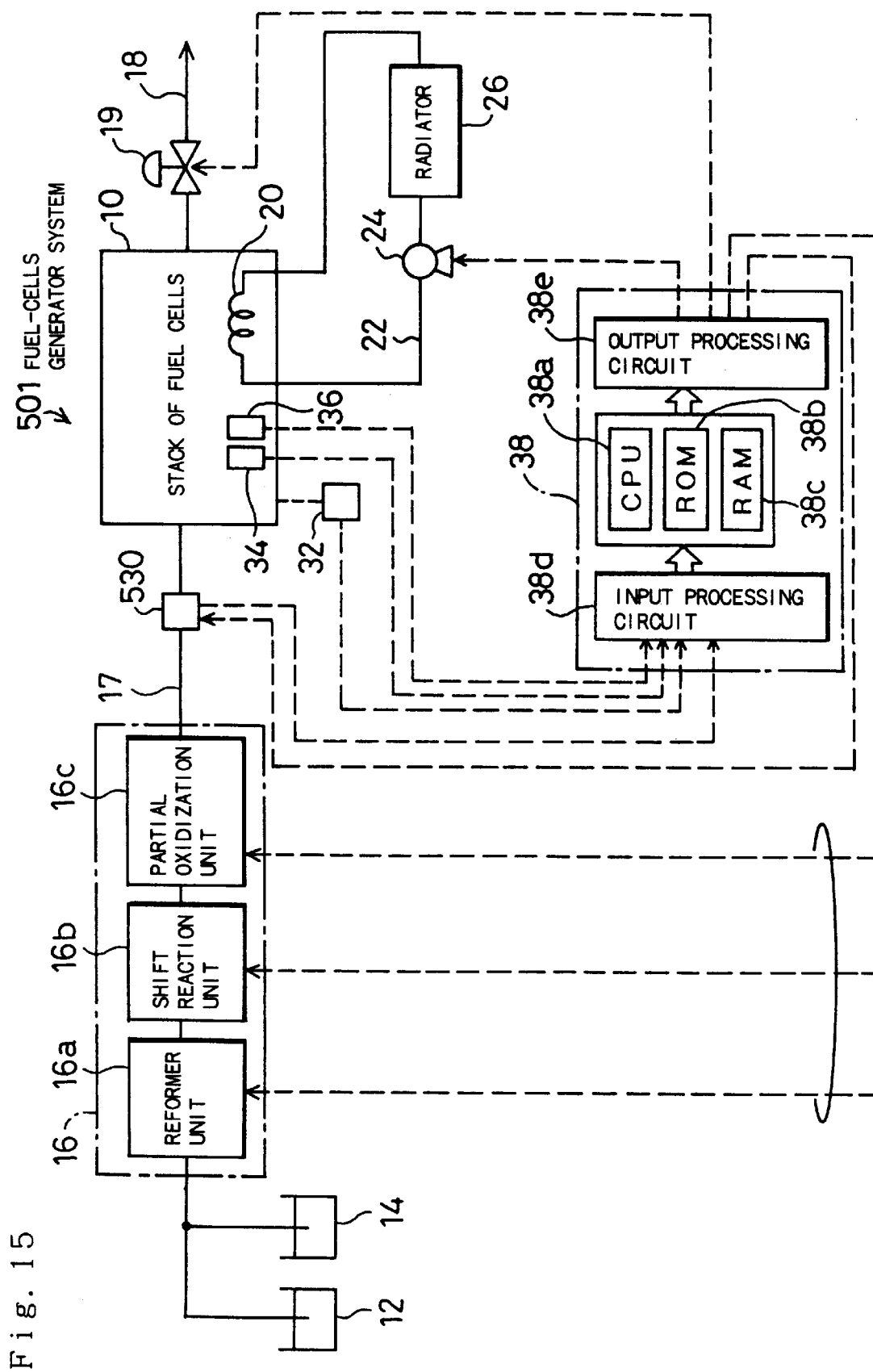
FIG. 15 is a block diagram schematically illustrating structure of a fuel-cells generator system 501 as a fourth embodiment according to the present invention.

FIG. 15 is a block diagram schematically illustrating structure of another fuel-cells generator system 501 as a fourth embodiment according to the present invention. The fuel-cells generator system 501 of the fourth embodiment has a similar hardware structure to that of the fuel-cells generator system 1 of the first embodiment, except structure of a carbon monoxide sensor 530. The same constituents as those of the first embodiment are defined by the like numerals.

Figure 16:
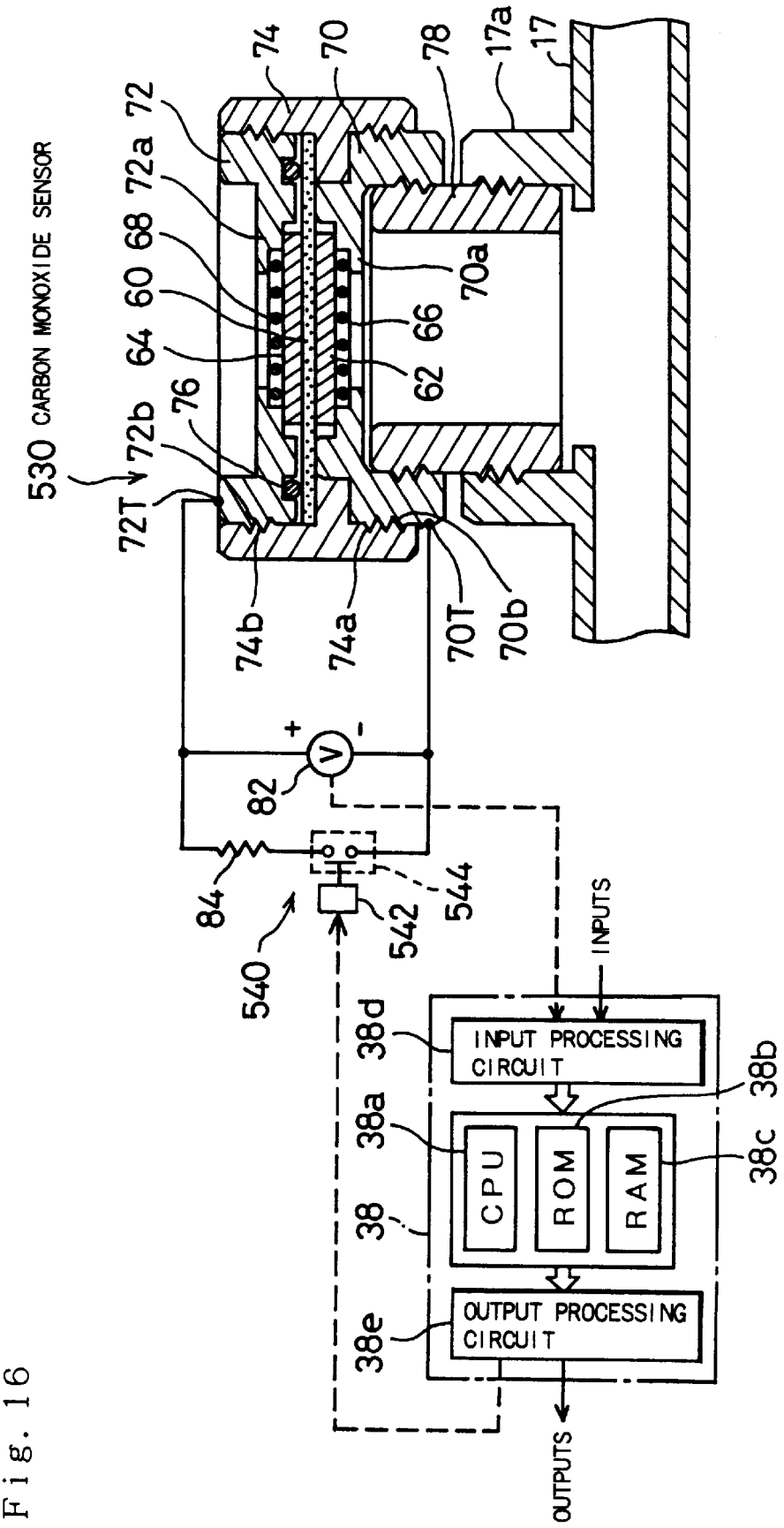
FIG. 16 shows a vertical section of a carbon monoxide sensor 530 with the electronic control unit 38.

FIG. 16 shows a vertical section of the carbon monoxide sensor 530 with the electronic control unit 38. The carbon monoxide sensor 530 of the fourth embodiment has an additional function of measuring methanol included in the gaseous fuel, as well as the function of measuring carbon monoxide included in the gaseous fuel like the first embodiment. The carbon monoxide sensor 530 accordingly has the same constituents as those of the carbon monoxide sensor 30 of the first embodiment and a function switching mechanism 540. The function switching mechanism 540 includes a relay 542 and a contact 544 of the relay 542. The function switching mechanism 540 is arranged between the detection terminals 70T and 72T to be parallel to the voltmeter 82. The contact 544 of the relay 542 and the resistor 84 are arranged in series.

In the off position of the relay 542, the contact 544 of the relay 542 is open to disconnect the resistor 84 from the detection terminals 70T and 72T. The potential difference measured by the voltmeter 82 in this state represents the open circuit voltage OCV between the electrodes 62 and 64. In the on position of the relay 542, on the other hand, the contact 544 of the relay 542 is closed to connect the resistor 84 with the detection terminals 70T and 72T. The potential difference measured by the voltmeter 82 in this state represents the potential difference between both terminals of the resistor 84. The relay 542 is connected to the output processing circuit 38e of the electronic control unit 38 and driven and controlled by the electronic control unit 38.

The electronic control unit 38 outputs a switching signal for switching the relay 542 between the on position and the off position to the carbon monoxide sensor 530 via the output processing circuit 38e. The carbon monoxide sensor 530 receives the switching signal and works in the manner discussed below.

In the on position of the relay 542 (that is, in the closed position of the contact 544), the resistor 84 is connected to the detection terminals 70T and 72T and the potential difference measured by the voltmeter 82 represents the potential difference between both terminals of the resistor 84. In this state, the carbon monoxide sensor 530 measures the concentration of carbon monoxide included in the hydrogen-rich gaseous fuel or the object gas in the same manner as the carbon monoxide sensor 30 of the first embodiment. In the off position of the relay 542 (that is, in the open position of the contact 544), on the contrary, the carbon monoxide sensor 530 measures the concentration of methanol included in the hydrogen-rich gaseous fuel. Measurement of the concentration of methanol follows a procedure discussed below.

In the carbon monoxide sensor 530, a supply of hydrogen in the gaseous fuel is fed to the electrode 62, whereas a supply of oxygen in the atmosphere is fed to the electrode 64. The reactions expressed by Equations (1) and (2) given previously thus proceed on the surface of the electrodes 62 and 64 across the electrolyte membrane 60.

These reactions are identical with the reactions in the fuel cells that receive supplies of hydrogen and oxygen and generate electricity, so that an electromotive force is generated between the electrodes 62 and 64. The electromotive force under the condition that no loading is connected between the electrodes 62 and 64 is referred to as the open circuit voltage OCV, the open end voltage, or the non-loading voltage. In case that methanol exists in the object gas, the open circuit voltage OCV between the electrodes 62 and 64 decreases with an increase in concentration of methanol. This is ascribed to the phenomenon that methanol in the object gas passes through the electrolyte membrane 60 and reacts with oxygen on the surface of the electrode 64 that is in contact with the electrolyte membrane 60, thereby lowering the potential on the electrode 64.

Figure 17:
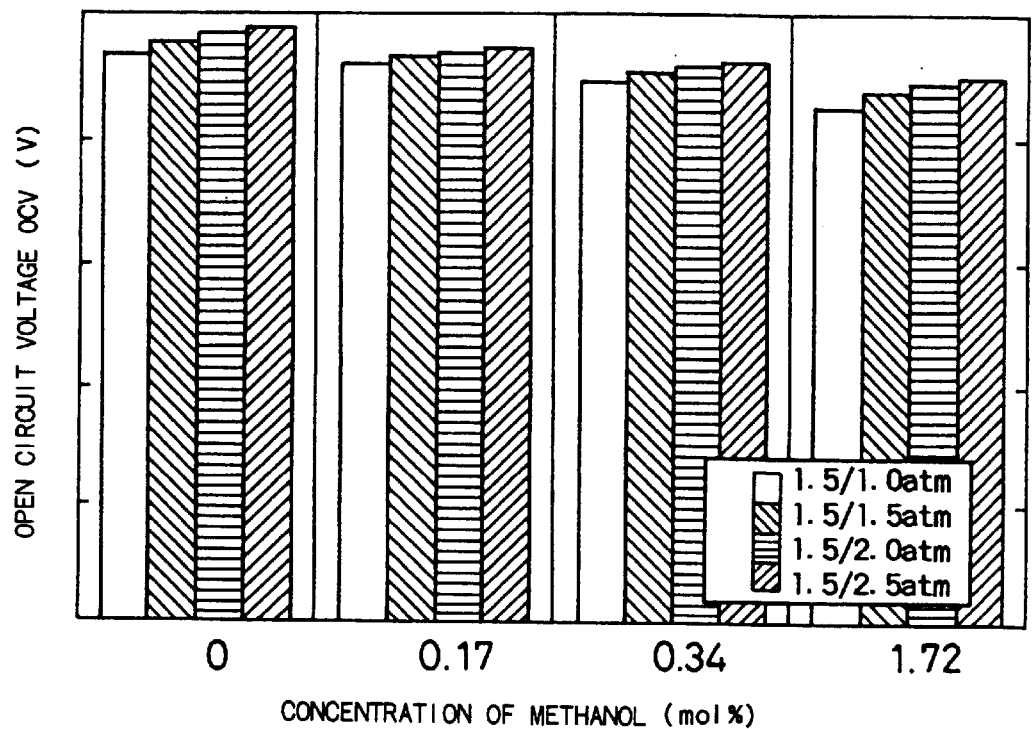
FIG. 17 is a graph showing the relationship between the concentration of methanol included in the object gas measured by the carbon monoxide sensor 530 and the open circuit voltage OCV between the electrodes 62 and 64.

The graph of FIG. 17 shows the relationship between the concentration of methanol included in the object gas and the open circuit voltage OCV between the electrodes 62 and 64. Four bars in the graph of FIG. 17 represent the open circuit voltages OCV at each concentration of methanol in the four different states, where the oxidizing gas of 1.0 atm (101 kPa), 1.5 atm (152 kPa), 2.0 atm (203 kPa), or 2.5 atm (253 kPa) is supplied to the electrode 64 against the object gas of 1.5 atm (152 kPa), as defined in the lower right box of the graph. As clearly seen from the graph of FIG. 17, the open circuit voltage OCV gradually decreases with an increase in concentration of methanol included in the object gas in all the four different states.

Figure 18:
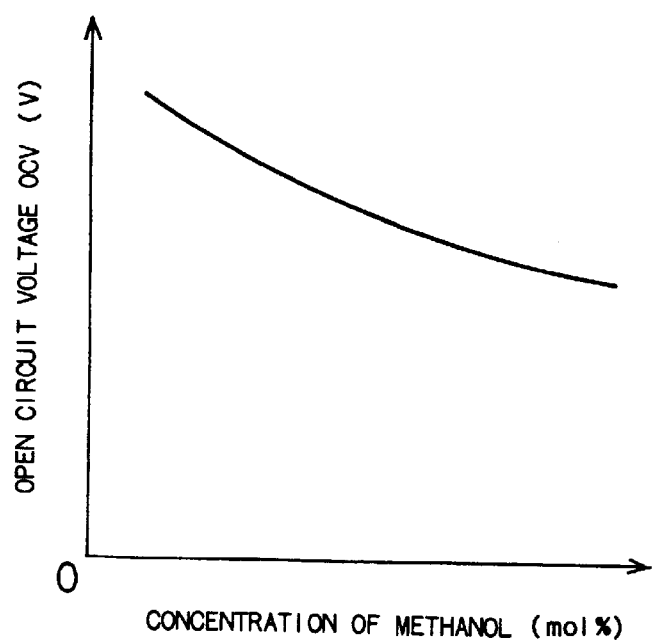
FIG. 18 is a graph showing the relationship between the concentration of methanol included in the object gas measured by the carbon monoxide sensor 530 and the open circuit voltage OCV measured by a voltmeter 82.

In the carbon monoxide sensor 530, the open circuit voltage OCV is measured by the voltmeter 82 and a detection signal representing the observed open circuit voltage OCV is input into the electronic control unit 38 via the input processing circuit 38d. In the electronic control unit 38, the CPU 38a refers to a map that has been stored previously in ROM 38b and shows the relationship between the concentration of methanol in the object gas and the open circuit voltage OCV measured by the voltmeter 82, for example, the graph of FIG. 18, and reads the concentration of methanol corresponding to the input open circuit voltage OCV. In this manner, the carbon monoxide sensor 530 detects the concentration of methanol included in the hydrogen-rich gas with high accuracy.

The reformer 16 used in the fourth embodiment is identical with that of the first embodiment and has the structure discussed below. The reformer 16 includes a reformer unit 16a, in which methanol is decomposed to carbon monoxide and hydrogen and the carbon monoxide thus obtained reacts with water to yield carbon dioxide and hydrogen, a shift reaction unit 16b, in which the remaining carbon monoxide that has not reacted in the reformer unit 16a is made to react with water, and a partial oxidization unit 16c, in which only the remaining carbon monoxide that has not reacted even in the shift reaction unit 16b is selectively oxidized. The respective units 16a through 16c are connected to the electronic control unit 38. The CPU 38a of the electronic control unit 38 controls the reformer unit 16a, the shift reaction unit 16b, and the partial oxidization unit 16c of the reformer 16, and changes the quality of the resulting hydrogen-rich gaseous fuel.

Figure 19:
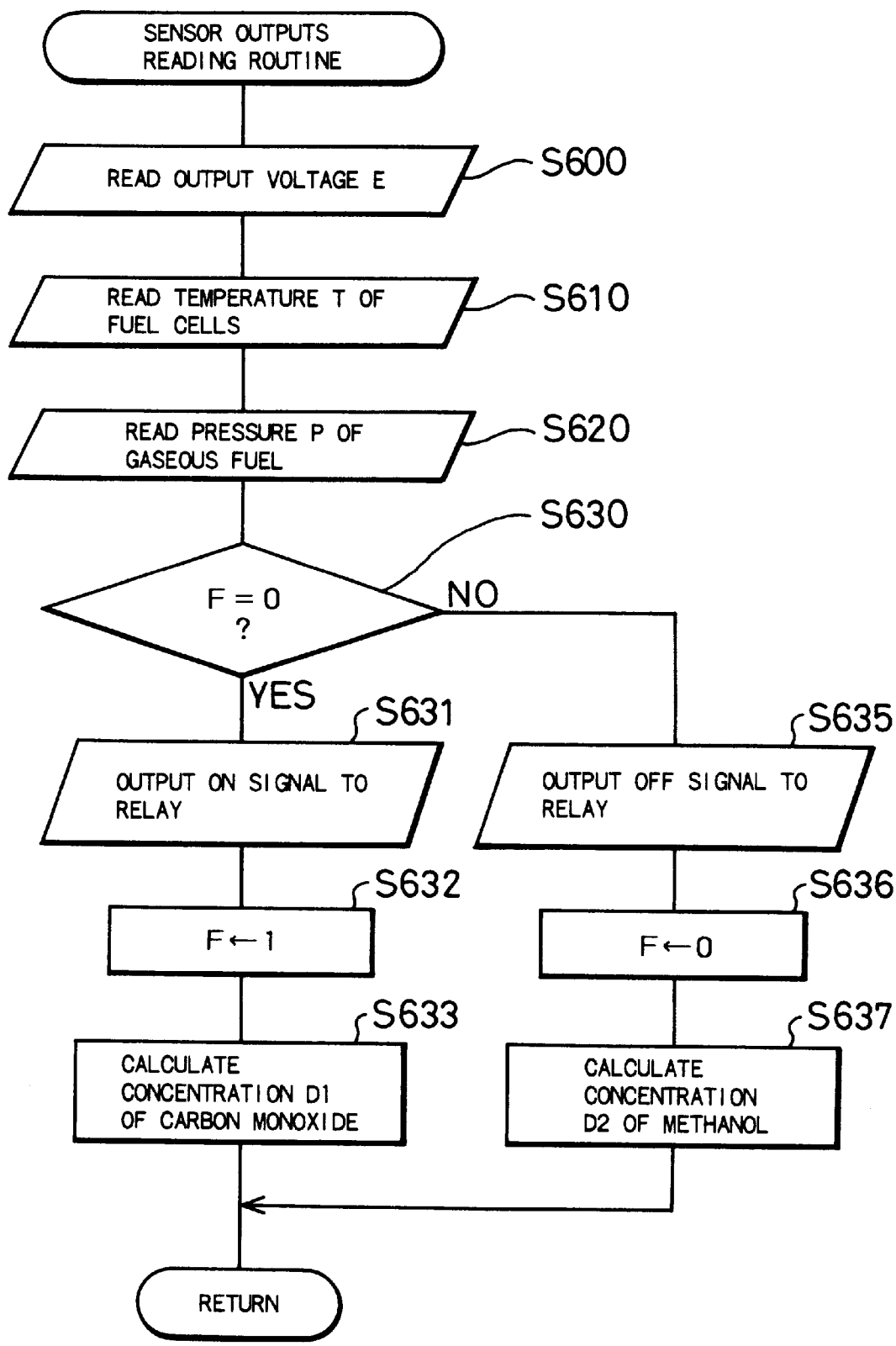
FIG. 19 is a flowchart showing a routine of reading the sensor outputs executed by the CPU in the fourth embodiment.

The following describes the control of the battery output executed by the electronic control unit 38 in the fourth embodiment. The control of the battery output is realized by the CPU 38a that follows a routine of reading the sensor outputs shown in the flowchart of FIG. 19 and a main routine shown in the flowchart of FIG. 20. The routine of reading the sensor outputs is repeatedly executed at predetermined time intervals, for example, at every 50 [msec]. When the program enters the routine of FIG. 19, the CPU 38a first reads the output voltage E of the stack of fuel cells 10, the fuel cell temperature T, and the fuel gas pressure P at steps S600, S610, and S620, which are identical with steps S100, S120, and S130 in the battery output control routine of the first embodiment.

The CPU 38a then determines whether or not a flag F is equal to zero at step S630. The flag F, which will be set or reset at the subsequent steps, is initially set to zero. When it is determined that the flag F is equal to zero at step S630, the CPU 38a outputs an ON signal to the relay 542 via the output processing circuit 38e so as to switch the relay 542 to the on position (that is, to switch the contact 544 to the closed position) at step S631. The flag F is then set to one at step S632. This changes the value of the flag F from the current state. At subsequent step S633, the CPU 38a reads the potential difference measured by the voltmeter 82 of the carbon monoxide sensor 530 and calculates a concentration D1 of carbon monoxide from the observed potential difference. Since the relay 542 has been switched to the on position, the potential difference measured by the voltmeter 82 at step S633 represents the potential difference between both terminals of the resistor 84. The carbon monoxide sensor 530 thus determines the concentration of carbon monoxide included in the object gas.

When it is determined that the flag is not equal to zero but is equal to one at step S630, on the other hand, the CPU 38a outputs an OFF signal to the relay 542 via the output processing circuit 38e so as to switch the relay 542 to the off position (that is, to switch the contact to the open position) at step S635. The flag F is then reset to zero at step S636. This changes the value of the flag F from the current state. At subsequent step S637, the CPU 38a reads the potential difference measured by the voltmeter 82 of the carbon monoxide sensor 530 and calculates a concentration D2 of methanol from the observed potential difference. Since the relay 542 has been switched to the off position, the potential difference measured by the voltmeter 82 at step S637 represents the open circuit voltage OCV. The carbon monoxide sensor 530 thus determines the concentration of methanol included in the object gas.

After execution of either step S633 or step S637, the program goes to RETURN and exits from this routine. The routine of reading the sensor outputs detects the output voltage E of the stack of fuel cells 10, the fuel cell temperature T, the fuel gas pressure P, the concentration D1 of carbon monoxide, and the concentration D2 of methanol as discussed above.

Figure 20:
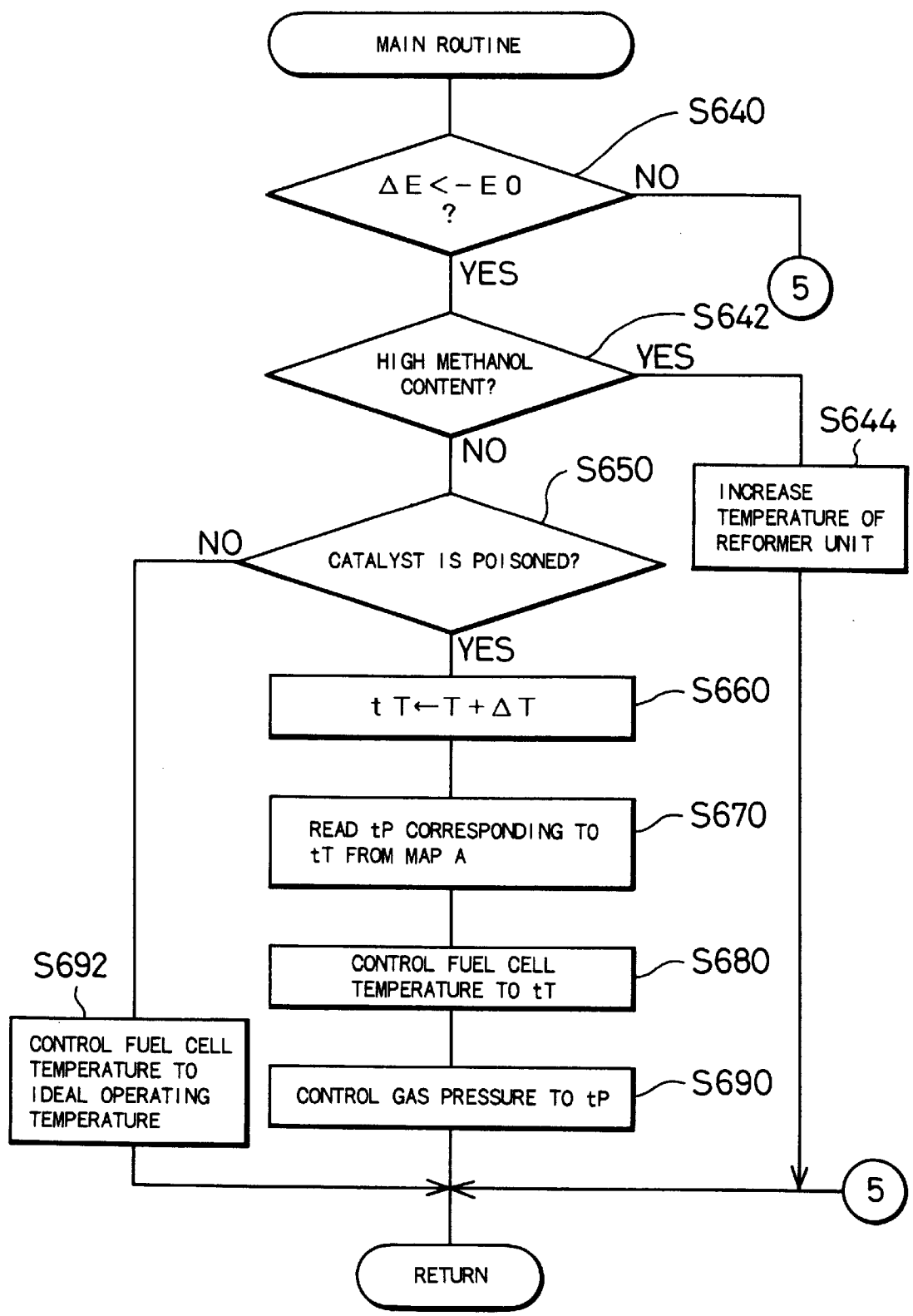
FIG. 20 is a flowchart showing a main routine executed by the CPU in the fourth embodiment.

The main routine of FIG. 20 is repeatedly executed at predetermined time intervals, for example, at every 100 [msec]. When the program enters the routine of FIG. 20, the CPU 38a first determines at step S640 whether or not the output voltage E of the stack of fuel cells 10, which has been read in the sensor outputs reading routine of FIG. 19, has been lowered by the amount of change that is not less than a predetermined voltage E0, which is identical with step S140 in the battery output control routine of the first embodiment. In case that the answer is negative at step S640, that is, when it is determined that the output voltage E of the fuel cells has not been lowered by the amount of change which is not less than the predetermined voltage E0, the program goes to RETURN and exits from this routine. In case that the answer is affirmative at step S640, that is, when it is determined that the output voltage E of the fuel cells has been lowered by the amount of change which is not less than the predetermined voltage E0, on the contrary, the program carries out the processing discussed below.

The CPU 38a determines whether or not the latest concentration D2 of methanol calculated in the sensor outputs reading routine is not less than a predetermined value (for example, 1%) at step S642. This determines whether or not the gaseous fuel contains a high concentration of methanol. In case that the gaseous fuel contains a high concentration of methanol, the program goes to step S644 to raise the temperature of the reformer unit 16a and thereby enhance the reactivity of methanol. In accordance with a concrete procedure, the CPU 38a outputs a control signal to the reformer unit 16a via the output processing circuit 38e. The enhanced reactivity of methanol in the reformer unit 16a reduces methanol included in the gaseous fuel. The program then goes to RETURN and exits from this routine.

When it is determined at step S642 that the gaseous fuel does not contain a high concentration of methanol, on the other hand, the program executes the processing of steps 650 through S692, which is identical with the processing of steps S150 through S192 in the battery output control routine of the first embodiment. In case that the catalyst is determined to be in the poisoned state based on the concentration D1 of carbon monoxide, the CPU 38a controls both the fuel cell temperature and the fuel gas pressure and enhance the output of the fuel cells. In case that the catalyst is determined not to be in the poisoned state, on the contrary, the CPU 38a controls the fuel cell temperature to the ideal operating temperature. The program then goes to RETURN and exits from this routine.

As discussed above, the fuel-cells generator system 501 of the fourth embodiment increases the operating temperature of the reformer unit 16a of the reformer 16 in response to the decrease in output voltage E of the stack of fuel cells 10, when the concentration of methanol included in the resulting gaseous fuel produced by the reformer 16 is not less than a predetermined value. The increased temperature reduces the concentration of methanol included in the gaseous fuel. In case that the output voltage E of the stack of fuel cells 10 is lowered due to the high concentration of methanol included in the gaseous fuel, this structure effectively enhances the output voltage E of the stack of fuel cells 10. In case that the output voltage E of the fuel cells is lowered due to the poisoned catalyst, on the other hand, this structure enhances the output voltage E of the fuel cells in the same manner as the first embodiment. The structure of the fourth embodiment ascribes the lowered output voltage E either to the poisoned catalyst or to the high concentration of methanol included in the gaseous fuel and takes a required measure according to the cause, thereby effectively enhancing the output of the fuel cells.

The carbon monoxide sensor 530 of the fourth embodiment has the function switching mechanism 540 in addition to the constituents of the carbon monoxide sensor 30 of the first embodiment, and can detect both carbon monoxide and methanol. The simple structure realizes both the poisoned state detection means and the methanol concentration detection means of the present invention.

Figure 21:
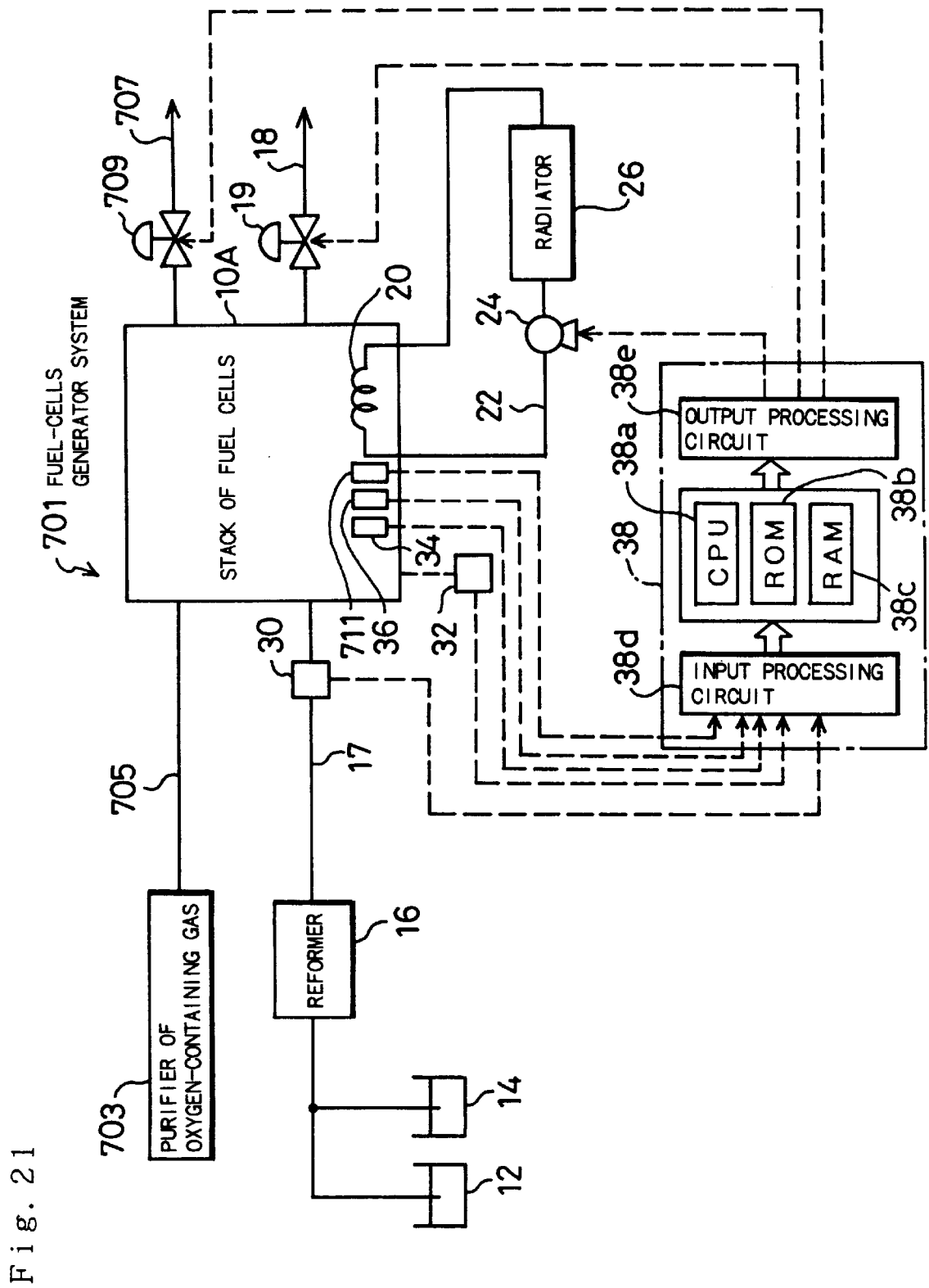
FIG. 21 is a block diagram schematically illustrating structure of a fuel-cells generator system 701 as a fifth embodiment according to the present invention.

FIG. 21 is a block diagram schematically illustrating structure of still another fuel-cells generator system 701 as a fifth embodiment according to the present invention. The fuel-cells generator system 701 of the fifth embodiment has all the constituents included in the fuel-cells generator system 1 of the first embodiment shown in FIG. 1, wherein the like numerals denote the like elements. The fuel-cells generator system 701 further includes an oxygen-containing gas purifier 703 for purifying the oxygen-containing gas, an oxygen-containing gas supply conduit 705 for connecting the oxygen-containing gas purifier 703 with a stack of fuel cells 10A, an oxygen-containing gas discharge conduit 707 for making the oxygen-containing gas discharged from the stack of fuel cells 10A flown outside, and a back-pressure regulating valve 709 for regulating the opening of the oxygen-containing gas discharge conduit 707. The oxygen-containing gas system is also included in the first embodiment, although illustration is omitted in the first embodiment. A pressure sensor 711 for measuring the pressure of the oxygen-containing gas is attached to the stack of fuel cells 10A, which is identical with the stack of fuel cells 10 of the first embodiment. In the description below, the pressure sensor 711 of the oxygen-containing gas is referred to as the second pressure sensor 711, whereas the pressure sensor 36 of the gaseous fuel discussed in the first embodiment is referred to as the first pressure sensor 36.

The second pressure sensor 711 is connected to the input processing circuit 38d of the electronic control unit 38. The back-pressure regulating valve 709 is connected to the output processing circuit 38e of the electronic control unit 38. The electronic control unit 38 receives detection signals output from various sensors including the second pressure sensor 711 and adjusts the position of the back-pressure regulating valve 709 in response to the input detection signals, thereby varying the flow rate of the oxygen-containing gas flowing through the flow paths 45p in the stack of fuel cells 10A.

Figure 22:
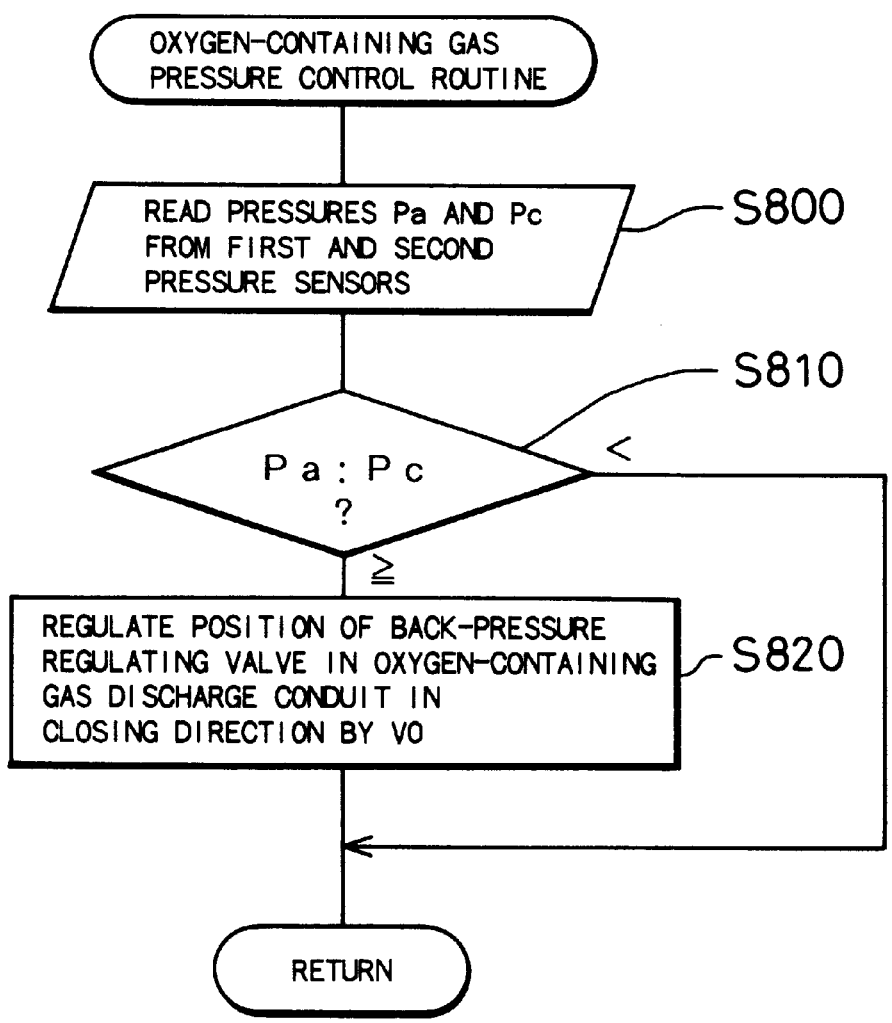
FIG. 22 is a flowchart showing a routine of regulating the pressure of oxygen-containing gas executed by the CPU in the fifth embodiment.

In the fifth embodiment, the electronic control unit 38 carries out the battery output control routine of the first embodiment discussed above, and subsequently executes a routine of controlling the pressure of the oxygen-containing gas. FIG. 22 is a flowchart showing the routine of controlling the pressure of the oxygen-containing gas. This control routine is repeatedly executed by the CPU 38a at predetermined time intervals, for example, at every 100 [msec]. When the program enters the routine of FIG. 22, the CPU 38a first reads a pressure Pa of the gaseous fuel (hereinafter may be referred to as the fuel gas pressure Pa) and a pressure Pc of the oxygen-containing gas (hereinafter may be referred to as the oxygen-containing gas pressure Pc) measured by the first and the second pressure sensors 36 and 711 at step S800.

The pressure Pa of the gaseous fuel is compared with the pressure Pc of the oxygen-containing gas at step S810. In case that the pressure Pa is not less than the pressure Pc, the program goes to step S820 to regulate the position of the back-pressure regulating valve 709 in the oxygen-containing gas discharge conduit 707 in the closing direction by a predetermined value V0, thereby increasing the pressure Pc of the oxygen-containing gas. This enables the pressure Pc of the oxygen-containing gas to gradually increase and exceed the pressure Pa of the gaseous fuel. The program then goes to RETURN and exits from this routine.

In case that the pressure Pc of the oxygen-containing gas is greater than the pressure Pa of the gaseous fuel at step S810, on the other hand, the program skips the processing of step S820 and directly goes to RETURN to exit from this routine.

Figure 23:
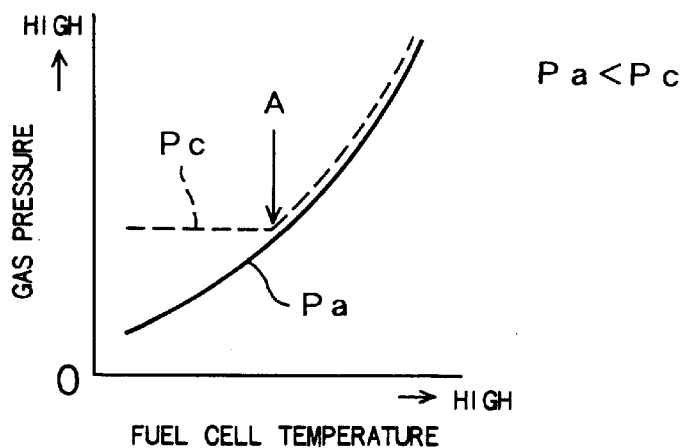
FIG. 23 is a graph showing variations in pressure Pa of gaseous fuel and pressure Pc of oxygen-containing gas plotted against the temperature of fuel cells in the fifth embodiment.

The oxygen-containing gas pressure control routine discussed above regulates the position Vc of the back-pressure regulating valve 709 in the oxygen-containing gas discharge conduit 707 and thereby enables the pressure Pc of the oxygen-containing gas to be kept greater than the pressure Pa of the gaseous fuel. FIG. 23 shows characteristic curves of the fuel gas pressure Pa and the oxygen-containing gas pressure Pc plotted against the fuel cell temperature under such conditions. The battery output control routine discussed in the first embodiment increases the pressure Pa of the gaseous fuel with an increase in fuel cell temperature. The pressure Pc of the oxygen-containing gas is, on the other hand, kept at a constant level up to a point A, where the fuel gas pressure Pa becomes equal to the oxygen-containing gas pressure Pc. The oxygen-containing gas pressure Pc then increases with an increase in fuel cell temperature along the curve of the fuel gas pressure Pa while keeping the difference of a predetermined value α.

In general, one of the relationships Pa>Pc, Pa=Pc, and Pa<Pc is held between the fuel gas pressure Pa on the anodes of the polymer electrolyte fuel cells and the oxygen-containing gas pressure Pc on the cathodes. Which pressure condition is to be selected for operation of the fuel-cells generator system depends upon the design and the structure of the fuel-cells generator system.

(1) In the case of Pa>Pa

Liquid methanol is vaporized and expanded in the methanol reformer, so that the pressure is readily heightened on the anode. In case that the air (atmosphere) is supplied to the cathode, a large energy of auxiliary machinery is required for pressuring the atmosphere and heightening the pressure. The fuel cells are accordingly operated under the pressure condition of Pa>Pc, with a view to improving the energy efficiency of the fuel-cells generator system.

(2) In the case of Pa=Pc

In the polymer electrolyte fuel cells, a fluorine ionexchange membrane is used as the electrolyte membrane. The ion-exchange membrane has a small thickness of 50 to 200 microns and a relatively low strength. A large pressure difference between the fuel gas pressure on the anode and the oxygen-containing gas pressure on the cathode increases the pressure applied to the ion-exchange membrane. The thin and relatively weak ion-exchange membrane is pressed strongly against the edges of the gas flow paths and may be damaged. The fuel cells with thin ion-exchange membranes are accordingly operated under the pressure condition of Pa=Pc.

(3) In the case of Pa<Pc

In the polymer electrolyte fuel cells, the proton conductivity of the ion-exchange membrane depends upon the water content included in the ion-exchange membrane. An increase in water content of the ion-exchange membrane is thus required to enhance the performance of the fuel cells. Water can be enclosed in the ion-exchange membrane by pressing back the water, which is produced on the cathodes through the electrochemical reactions in the fuel cells, toward the anodes. The fuel cells are operated under the pressure condition of Pa<Pc, with a view to creating such an environment.

Which one of the pressure conditions (1), (2), (3) is to be selected depends upon where the importance is attached in the fuel-cells generator system. There is accordingly no superiority or inferiority between these three conditions. The fifth embodiment carries out the oxygen-containing gas pressure control routine discussed above and thereby holds the relationship of Pa<Pc, with a view to enhancing the moisture retention of the electrolyte membrane.

As discussed above, the fuel-cells generator system 701 of the fifth embodiment carries out the oxygen-containing gas pressure control routine and enables the pressure Pc of the oxygen-containing gas to exceed the pressure Pa of the gaseous fuel, even when the battery output control routine discussed in the first embodiment increases the pressure Pa of the gaseous fuel. The structure of the fifth embodiment exerts the same effects as those of the first embodiment, such as recovery of the battery output, and has excellent moisture retention of the electrolyte membrane 41 as discussed above in the case of (3).

Figure 24:
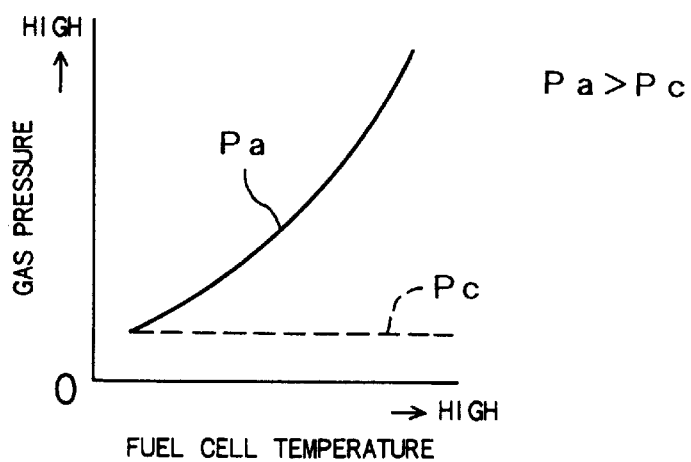
FIG. 24 is a graph showing variations in Pa and Pc plotted against the temperature of fuel cells under the condition of Pa>Pc.

Although the relationship (3) Pa<Pc is held in the fifth embodiment, another possible structure holds the relationship (1) Pa>Pc. In this alternative structure, as shown in FIG. 24, while the battery output control routine discussed in the first embodiment increases the pressure Pa of the gaseous fuel with an increase in fuel cell temperature, the pressure Pc of the oxygen-containing gas is kept at a constant level and does not vary with an increase in pressure Pa of the gaseous fuel.

Figure 25:
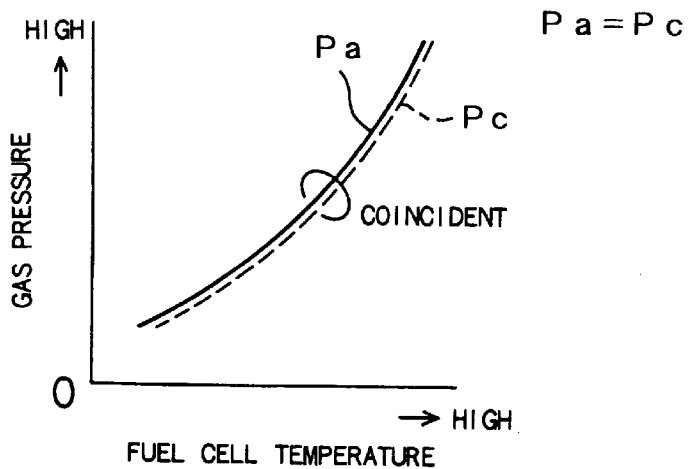
FIG. 25 is a graph showing variations in Pa and Pc plotted against the temperature of fuel cells under the condition of Pa=Pa.

Still another possible structure holds the relationship (2) Pa=Pc. In this structure, as shown in FIG. 25, while the battery output control routine discussed in the first embodiment increases the pressure Pa of the gaseous fuel with an increase in fuel cell temperature, the pressure Pc of the oxygen-containing gas increases with the increase in pressure Pa of the gaseous fuel.

These modified structures enable operation of the fuel cells under a desired relationship between the pressures of the gaseous fuel and the oxidizing gas even when the pressure Pa of the gaseous fuel is forcibly increased by the battery output control routine, and accordingly have excellent stability in operation.

The following describes a sixth embodiment according to the present invention. A fuel-cells generator system of the sixth embodiment has identical hardware structure with and similar software structure to those of the fuel-cells generator system 701 of the fifth embodiment. Only difference is the oxygen-containing gas pressure control routine executed by the CPU 38a of the electronic control unit 38. Namely the sixth embodiment realizes the hardware structure and the software structure of the fuel-cells generator system 1 of the first embodiment and carries out an oxygen-containing gas pressure control routine discussed below.

Figure 26:
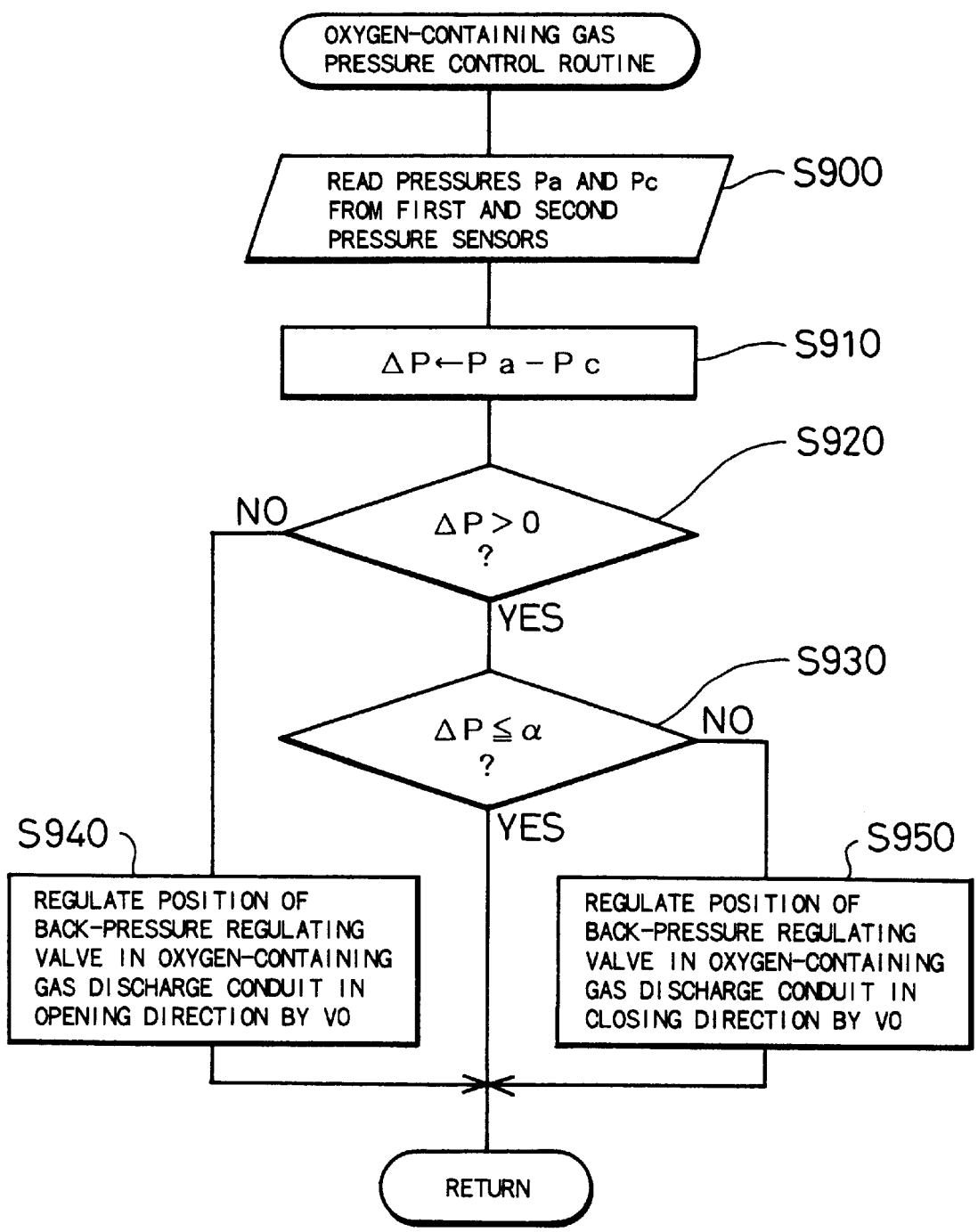
FIG. 26 is a flowchart showing a routine of regulating the pressure of oxygen-containing gas executed by the CPU in a sixth embodiment according to the present invention.

FIG. 26 is a flowchart showing the oxygen-containing gas pressure control routine carried out in the sixth embodiment. This control routine is repeatedly executed by the CPU 38a at predetermined time intervals, for example, at every 100 [msec]. When the program enters the routine of FIG. 26, the CPU 38a first reads the fuel gas pressure Pa and the oxygen-containing gas pressure Pc measured by the first and the second pressure sensors 36 and 711 at step S900.

The CPU 38a then subtracts the oxygen-containing gas pressure Pc from the fuel gas pressure Pa to calculate a pressure difference ΔP at step S910. The CPU 38a subsequently determines whether or not the pressure difference ΔP is greater than zero at step S920 and determines whether or not the pressure difference ΔP is not greater than a predetermined value α (α is a positive value and, for example, 10 [kPa]) at step S930. In case that the answer is negative at step S920, that is, when the pressure difference ΔP is not greater than zero, the program goes to step S940 to regulate the position of the back-pressure regulating valve 709 in the oxygen-containing gas discharge conduit 707 in the opening direction by a predetermined value V0 and thereby reduce the oxygen-containing gas pressure Pc. This makes the pressure difference ΔP greater than zero.

In case that the answer is negative at step S930, that is, when the pressure difference ΔP is greater than the predetermined value α, the program proceeds to step S950 to regulate the position of the back-pressure regulating valve 709 in the oxygen-containing gas discharge conduit 707 in the closing direction by the predetermined value V0 and thereby increase the oxygen-containing gas pressure Pc. This enables the pressure difference ΔP to be not greater than the predetermined value α.

After execution of either step S940 or step S950 or after the affirmative answers at steps S920 and S930, that is, when the relationship of 0<ΔP≦α is satisfied, the program goes to RETURN and exits from this routine.

Figure 27:
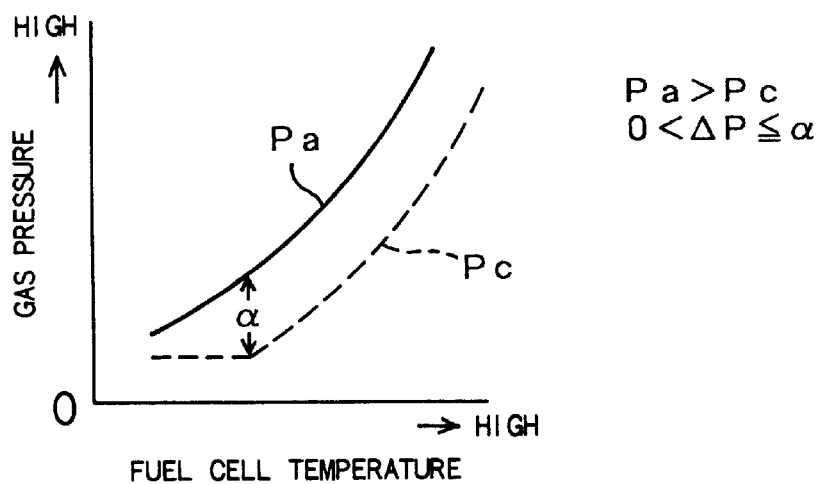
FIG. 27 is a graph showing variations in pressure Pa of gaseous fuel and pressure Pc of oxygen-containing gas plotted against the temperature of fuel cells in the sixth embodiment.

The oxygen-containing gas pressure control routine of the sixth embodiment regulates the position Vc of the back-pressure regulating valve 709 in the oxygen-containing gas discharge conduit 707 and thereby enables the pressure difference ΔP obtained by subtracting the oxygen-containing gas pressure Pc from the fuel gas pressure Pa to be kept within the range of 0 to the predetermined value α. FIG. 27 shows characteristic curves of the fuel gas pressure Pa and the oxygen-containing gas pressure Pc plotted against the fuel cell temperature under such conditions. The battery output control routine discussed in the first embodiment increases the pressure Pa of the gaseous fuel with an increase in fuel cell temperature. The pressure Pc of the oxygen-containing gas is, on the other hand, kept at a constant level until the pressure difference ΔP between the fuel gas pressure Pa and the oxygen-containing gas pressure Pc becomes equal to or greater than the predetermined value α. The oxygen-containing gas pressure Pc then increases with an increase in fuel cell temperature while keeping the pressure difference ΔP of the predetermined value α.

As discussed above, the fuel-cells generator system of the sixth embodiment carries out the oxygen-containing gas pressure control routine and enables the pressure difference ΔP between the fuel gas pressure Pa and the oxygen-containing gas pressure Pc to be kept equal to or less than the predetermined value α, even when the battery output control routine discussed in the first embodiment increases the pressure Pa of the gaseous fuel. The structure of the sixth embodiment exerts the same effects as those of the first embodiment, such as recovery of the battery output, and effectively prevents the electrolyte membrane 41 from being damaged by the pressure difference ΔP. The sixth embodiment holds the relationship (1) Pa>Pc and accordingly does not require large energy of auxiliary machinery for pressurization, which results in improvement of the energy efficiency.

The following describes a seventh embodiment according to the present invention. A fuel-cells generator system of the seventh embodiment has identical hardware structure with and similar software structure to those of the fuel-cells generator system of the sixth embodiment. Only difference is the oxygen-containing gas pressure control routine executed by the CPU 38a of the electronic control unit 38.

Figure 28:
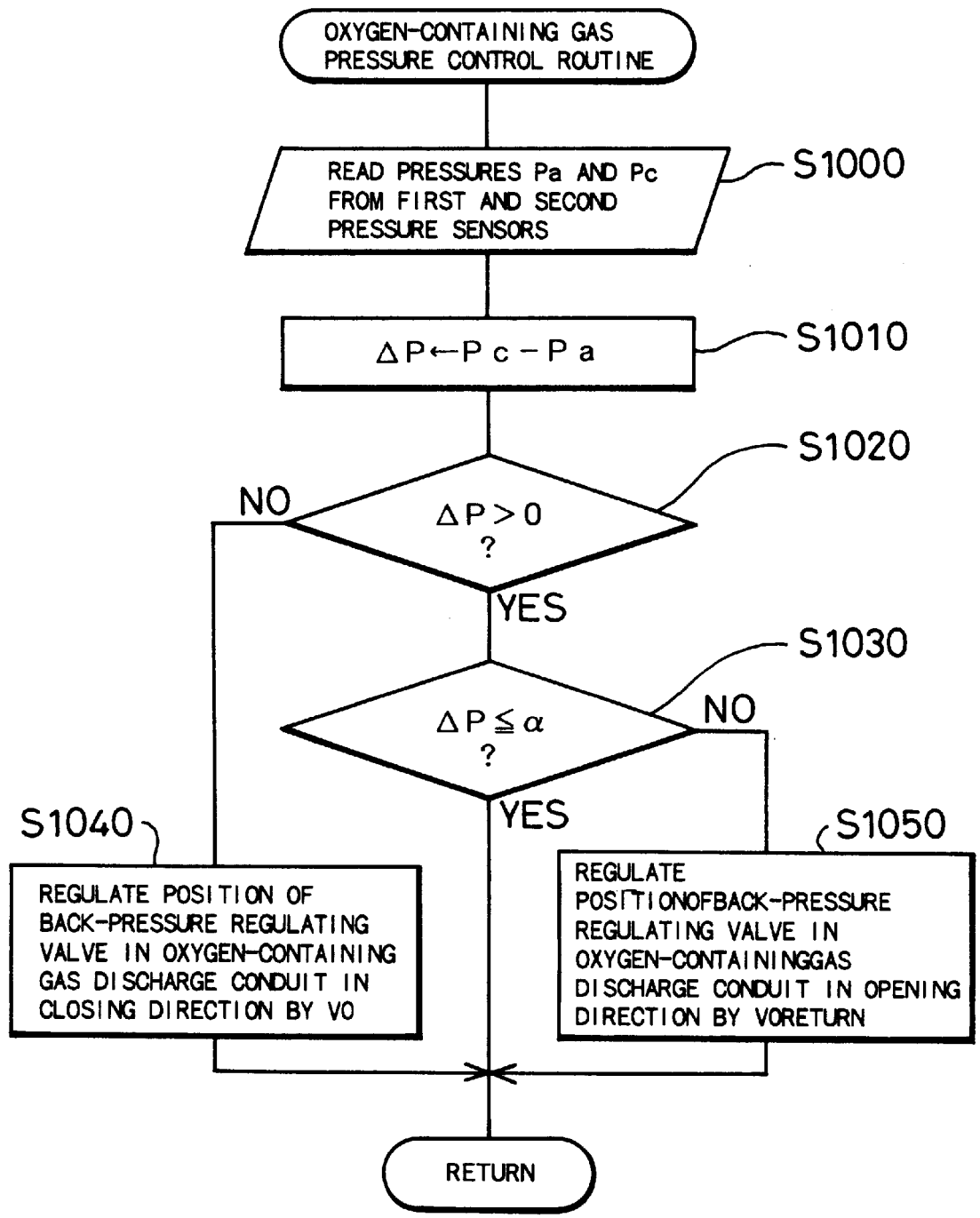
FIG. 28 is a flowchart showing a routine of regulating the pressure of oxygen-containing gas executed by the CPU in a seventh embodiment according to the present invention.

FIG. 28 is a flowchart showing the oxygen-containing gas pressure control routine carried out in the seventh embodiment. This control routine is repeatedly executed by the CPU 38a at predetermined time intervals, for example, at every 100 [msec]. When the program enters the routine of FIG. 28, the CPU 38a first reads the fuel gas pressure Pa and the oxygen-containing gas pressure Pc measured by the first and the second pressure sensors 36 and 711 at step S1000.

The CPU 38a then subtracts the fuel gas pressure Pa from the oxygen-containing gas pressure Pc to calculate a pressure difference ΔP at step S1010. The CPU 38a subsequently determines whether or not the pressure difference ΔP is greater than zero at step S1020 and determines whether or not the pressure difference ΔP is not greater than a predetermined value α (α is a positive value and may be identical with or different from the value set in the sixth embodiment) at step S1030. In case that the answer is negative at step S1020, that is, when the pressure difference ΔP is not greater than zero, the program goes to step S1040 to regulate the position of the back-pressure regulating valve 709 in the oxygen-containing gas discharge conduit 707 in the closing direction by a predetermined value V0 and thereby increase the oxygen-containing gas pressure Pc. This makes the pressure difference ΔP greater than zero.

In case that the answer is negative at step S1030, that is, when the pressure difference ΔP is greater than the predetermined value α, the program proceeds to step S1050 to regulate the position of the back-pressure regulating valve 709 in the oxygen-containing gas discharge conduit 707 in the opening direction by the predetermined value V0 and thereby reduce the oxygen-containing gas pressure Pc. This enables the pressure difference ΔP to be not greater than the predetermined value α.

After execution of either step S1040 or step S1050 or after the affirmative answers at steps S1020 and S1030, that is, when the relationship of 0<ΔP≦α a is satisfied, the program goes to RETURN and exits from this routine.

Figure 29:
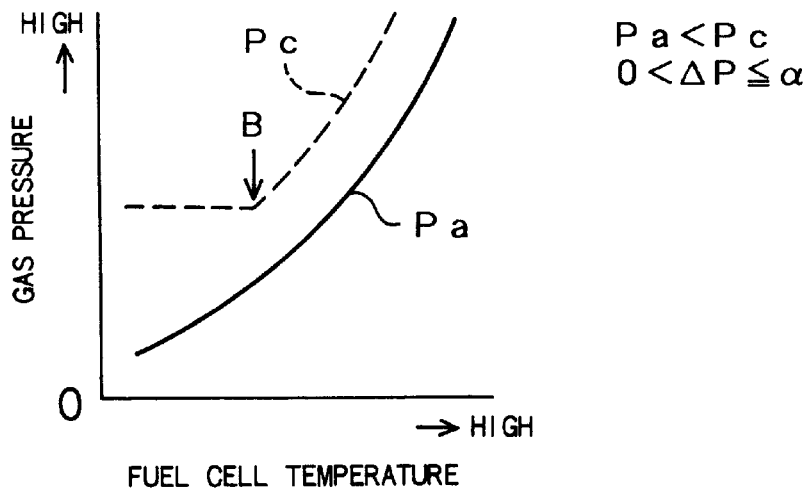
FIG. 29 is a graph showing variations in pressure Pa of gaseous fuel and pressure Pc of oxygen-containing gas plotted against the temperature of fuel cells in the seventh embodiment.

The oxygen-containing gas pressure control routine of the seventh embodiment regulates the position Vc of the back-pressure regulating valve 709 in the oxygen-containing gas discharge conduit 707 and thereby enables the pressure difference ΔP obtained by subtracting the fuel gas pressure Pa from the oxygen-containing gas pressure Pc to be kept within the range of 0 to the predetermined value α. FIG. 29 shows characteristic curves of the fuel gas pressure Pa and the oxygen-containing gas pressure Pc plotted against the fuel cell temperature under such conditions. The battery output control routine discussed in the first embodiment increases the pressure Pa of the gaseous fuel with an increase in fuel cell temperature. The pressure Pc of the oxygen-containing gas is, on the other hand, kept at a constant level up to a point B where the pressure difference ΔP between the fuel gas pressure Pa and the oxygen-containing gas pressure Pc becomes equal to or greater than the predetermined value α. The oxygen-containing gas pressure Pc then increases with an increase in fuel cell temperature along the curve of the fuel gas pressure Pa while keeping the pressure difference ΔP of the predetermined value α.

As discussed above, the fuel-cells generator system of the seventh embodiment carries out the oxygen-containing gas pressure control routine and enables the oxygen-containing gas pressure Pc to be kept greater than the fuel gas pressure Pa and the pressure difference ΔP between the fuel gas pressure Pa and the oxygen-containing gas pressure Pc to be kept equal to or less than the predetermined value α, even when the battery output control routine discussed in the first embodiment increases the pressure Pa of the gaseous fuel. The structure of the seventh embodiment exerts the same effects as those of the first embodiment, such as recovery of the battery output, and effectively prevents the electrolyte membrane 41 from being damaged by the pressure difference ΔP. The seventh embodiment holds the relationship (3) Pa<Pc and accordingly enhances the moisture retention of the electrolyte membrane 41.

The following describes an eighth embodiment according to the present invention. A fuel-cells generator system of the eighth embodiment has identical hardware structure with and similar software structure to those of the fuel-cells generator systems of the fifth through the seventh embodiments. Only difference is the oxygen-containing gas pressure control routine executed by the CPU 38*a* of the electronic control unit 38. Namely the eighth embodiment realizes the hardware structure and the software structure of the fuel-cells generator system 1 of the first embodiment and carries out an oxygen-containing gas pressure control routine discussed below.

Figure 30:
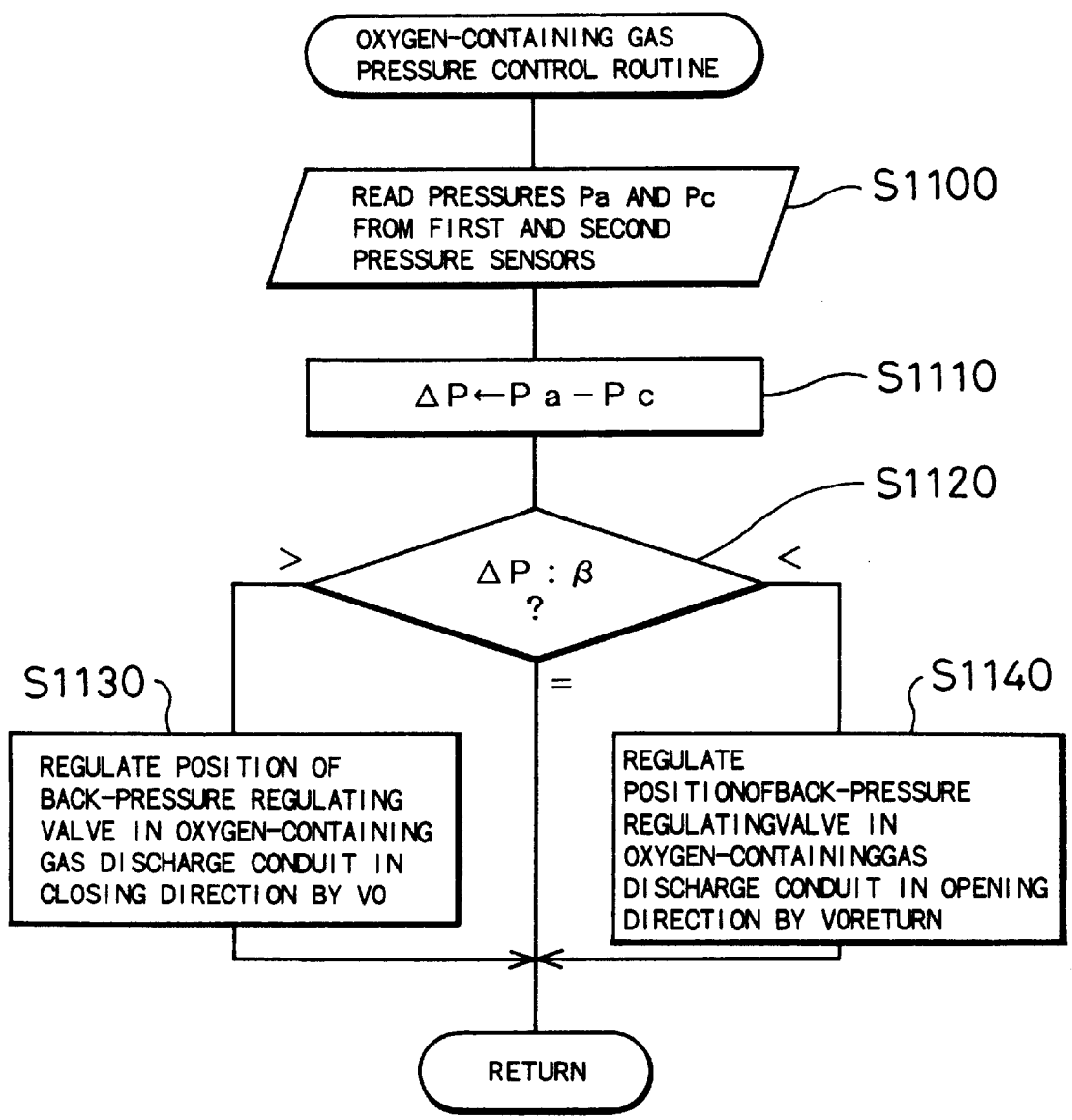
FIG. 30 is a flowchart showing a routine of regulating the pressure of oxygen-containing gas executed by the CPU in an eighth embodiment according to the present invention.

FIG. 30 is a flowchart showing the oxygen-containing gas pressure control routine carried out in the eighth embodiment. This control routine is repeatedly executed by the CPU 38*a* at predetermined time intervals, for example, at every 100 [msec]. When the program enters the routine of FIG. 30, the CPU 38*a* first reads the fuel gas pressure Pa and the oxygen-containing gas pressure Pc measured by the first and the second pressure sensors 36 and 711 at step S1100.

The CPU 38*a* then subtracts the oxygen-containing gas pressure Pc from the fuel gas pressure Pa to calculate a pressure difference ΔP at step S1110. The pressure difference ΔP is compared with a predetermined value β (β is a positive value and, for example, 10 [kpa]) at step S1120. In case that the pressure difference ΔP is determined to be greater than the predetermined value A, the program proceeds to step S1130 to regulate the position of the back-pressure regulating valve 709 in the oxygen-containing gas discharge conduit 707 in the closing direction by a predetermined value V0 and thereby increase the oxygen-containing gas pressure Pc. This decreases the pressure difference ΔP to be not greater than the predetermined value β.

In case that the pressure difference ΔP is determined to be smaller than the predetermined value β at step S1120, on the other hand, the program proceeds to step S1140 to regulate the position of the back-pressure regulating valve 709 in the oxygen-containing gas discharge conduit 707 in the opening direction by the predetermined value V0 and thereby reduce the oxygen-containing gas pressure Pc. This increases the pressure difference ΔP to be not less than the predetermined value β. In case that the pressure difference ΔP is determined to be equal to the predetermined value β at step S1120, the program goes to RETURN and exits from this routine.

Figure 31:
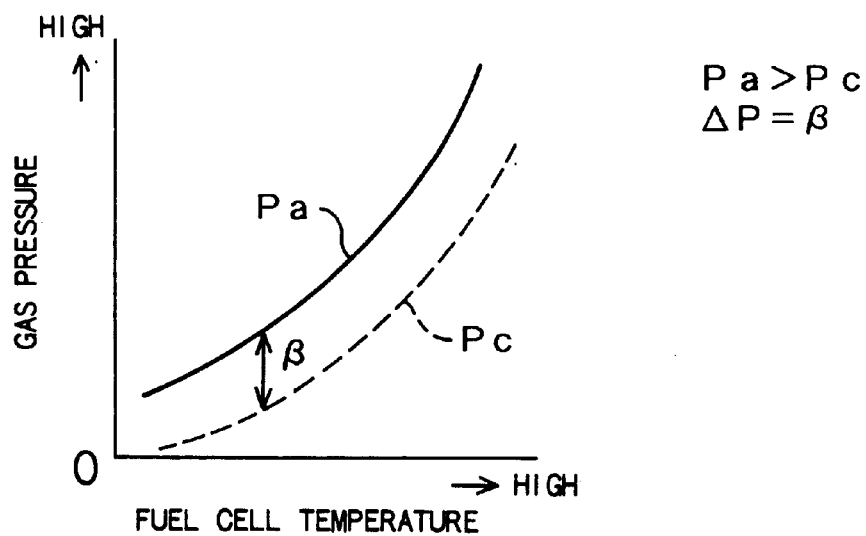
FIG. 31 is a graph showing variations in pressure Pa of gaseous fuel and pressure Pc of oxygen-containing gas plotted against the temperature of fuel cells in the eighth embodiment.

The oxygen-containing gas pressure control routine of the eighth embodiment regulates the position Vc of the back-pressure regulating valve 709 in the oxygen-containing gas discharge conduit 707 and thereby enables the pressure difference ΔP obtained by subtracting the oxygen-containing gas pressure Pc from the fuel gas pressure Pa to be kept at the predetermined value β. FIG. 31 shows characteristic curves of the fuel gas pressure Pa and the oxygen-containing gas pressure Pc plotted against the fuel cell temperature under such conditions. The battery output control routine discussed in the first embodiment increases the pressure Pa of the gaseous fuel with an increase in fuel cell temperature. The pressure Pc of the oxygen-containing gas increases with an increase in fuel cell temperature, while keeping the pressure difference ΔP of the predetermined value β.

The fuel-cells generator system of the eighth embodiment exerts the same effects as those of the first embodiment, such as recovery of the battery output. The eighth embodiment holds the relationship (1) Pa>Pc and accordingly does not require large energy of auxiliary machinery for pressurization, which results in improvement of the energy efficiency.

The following describes a ninth embodiment according to the present invention. A fuel-cells generator system of the ninth embodiment has identical hardware structure with and similar software structure to those of the fuel-cells generator system of the eighth embodiment. Only difference is the oxygen-containing gas pressure control routine executed by the CPU 38*a* of the electronic control unit 38.

Figure 32:
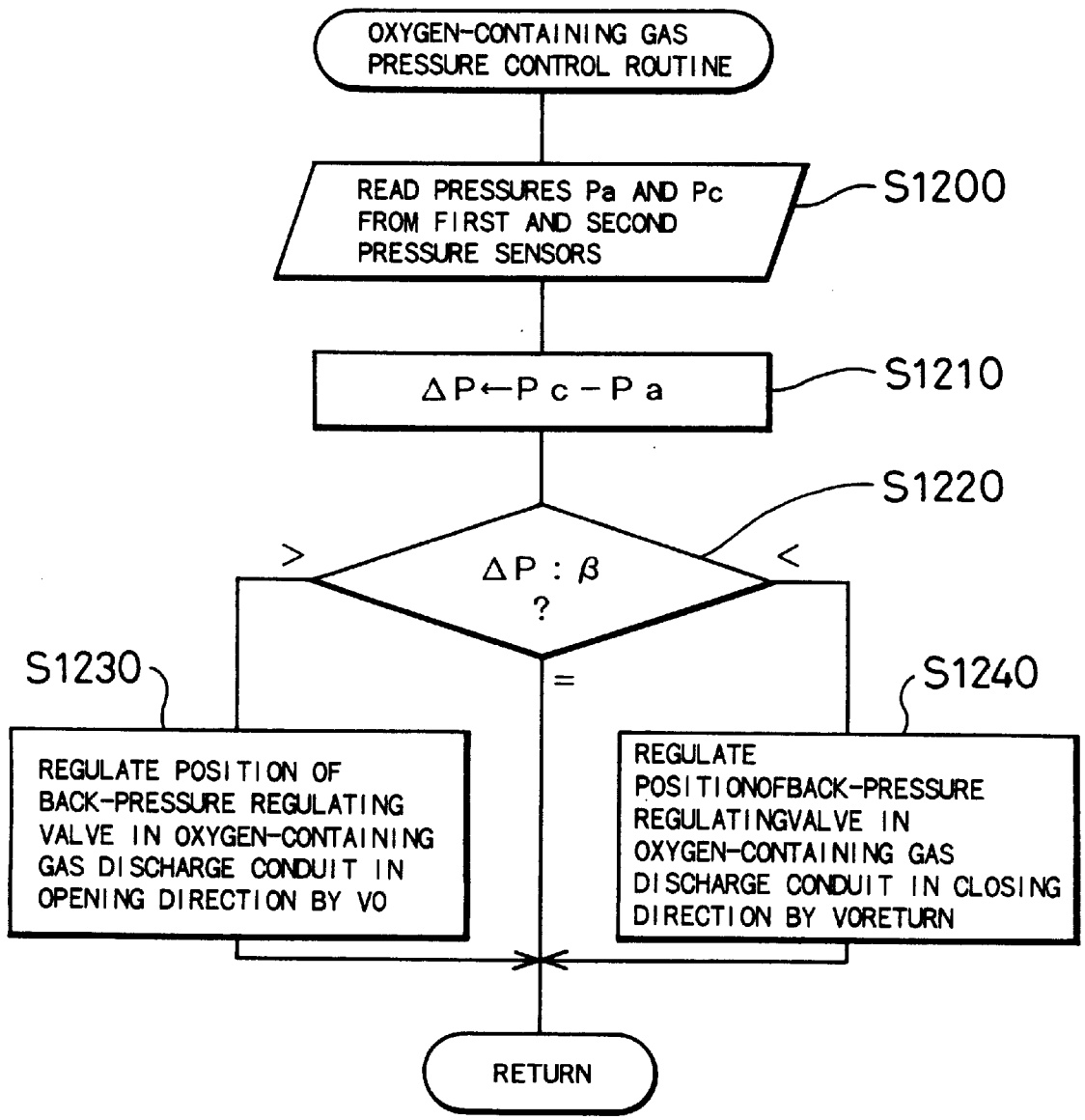
FIG. 32 is a flowchart showing a routine of regulating the pressure of oxygen-containing gas executed by the CPU in a ninth embodiment according to the present invention.

FIG. 32 is a flowchart showing the oxygen-containing gas pressure control routine carried out in the ninth embodiment. This control routine is repeatedly executed by the CPU 38*a* at predetermined time intervals, for example, at every 100 [msec]. When the program enters the routine of FIG. 32, the CPU 38*a* first reads the fuel gas pressure Pa and the oxygen-containing gas pressure Pc measured by the first and the second pressure sensors 36 and 711 at step S1200.

The CPU 38*a* then subtracts the fuel gas pressure Pa from the oxygen-containing gas pressure Pc to calculate a pressure difference ΔP at step S1210. The pressure difference ΔP is compared with a predetermined value β (β is a positive value and may be identical with or different from the value set in the eighth embodiment) at step S1220. In case that the pressure difference ΔP is determined to be greater than the predetermined value β, the program proceeds to step S1230 to regulate the position of the back-pressure regulating valve 709 in the oxygen-containing gas discharge conduit 707 in the opening direction by a predetermined value V0 and thereby reduce the oxygen-containing gas pressure Pc. This decreases the pressure difference ΔP to be not greater than the predetermined value β.

In case that the pressure difference ΔP is determined to be smaller than the predetermined value β at step S1220, on the other hand, the program proceeds to step S1240 to regulate the position of the back-pressure regulating valve 709 in the oxygen-containing gas discharge conduit 707 in the closing direction by the predetermined value V0 and thereby increase the oxygen-containing gas pressure Pc. This increases the pressure difference ΔP to be not less than the predetermined value β. In case that the pressure difference ΔP is determined to be equal to the predetermined value β at step S1220, the program goes to RETURN and exits from this routine.

Figure 33:
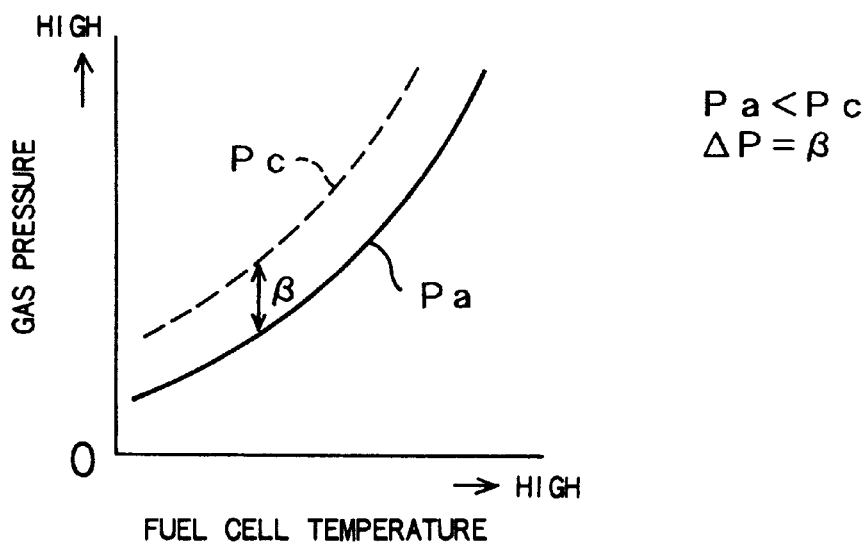
FIG. 33 is a graph showing variations in pressure Pa of gaseous fuel and pressure Pc of oxygen-containing gas plotted against the temperature of fuel cells in the ninth embodiment.

The oxygen-containing gas pressure control routine of the ninth embodiment regulates the position Vc of the back-pressure regulating valve 709 in the oxygen-containing gas discharge conduit 707 and thereby enables the pressure difference ΔP obtained by subtracting the fuel gas pressure Pa from the oxygen-containing gas pressure Pc to be kept at the predetermined value β. FIG. 33 shows characteristic curves of the fuel gas pressure Pa and the oxygen-containing gas pressure Pc plotted against the fuel cell temperature under such conditions. The battery output control routine discussed in the first embodiment increases the pressure Pa of the gaseous fuel with an increase in fuel cell temperature. The pressure Pc of the oxygen-containing gas increases with an increase in fuel cell temperature along the curve of the fuel gas pressure Pa, while keeping the pressure difference ΔP of the predetermined value β.

The fuel-cells generator system of the ninth embodiment exerts the same effects as those of the first embodiment, such as recovery of the battery output. The ninth embodiment holds the relationship (3) Pa<Pc and accordingly enhances the moisture retention of the electrolyte membrane 41 by the water produced on the cathode. The fuel-cells generator system of this embodiment keeps the pressure difference ΔP between the gaseous fuel and the oxygen-containing gas at the predetermined value β and thus maintains the water content of the electrolyte membrane 41 at a constant level.

In the embodiments discussed above, the carbon monoxide sensor 30 is applied for the poisoned state detection means to measure the concentration of CO included in the gaseous fuel and determine the poisoned state of the catalyst when the CO concentration becomes equal to or greater than a predetermined level. The poisoned state detection means is, however, not restricted to the carbon monoxide sensor 30, and carbon monoxide sensors of other structures, for example, a constant-potential electrolytic carbon monoxide sensor, may also be applicable. Another possible structure applicable for the poisoned state detection means detects the temperature difference between the flow-in side and the flow-out side of the gaseous fuel on the electrode and estimates the poisoned state of the catalyst based on the temperature difference.

In the embodiments discussed above, platinum is used as the catalyst carried on the anodes 42 in the stack of fuel cells 10. A variety of platinum alloys can also be used as the catalyst carried on the anode 42. The platinum alloys include platinum as the first component and one or a plurality of elements selected among the group including ruthenium, nickel, cobalt, vanadium, palladium, and indium, as the second component. Such platinum alloys ensure the same effects as those of the respective embodiments discussed above.

The methanol reformer is used as the supply source of the hydrogen-rich gas in the embodiments discussed above. The fuel-cells generator system may, however, be combined with another reformer that produces a hydrogen-rich gas. The available reformers receive alcohols, such as methanol and ethanol, hydrocarbons, such as methane, propane, and butane, or liquid fuels, such as gasoline and light oil, as the materials of reforming reactions. The reforming reactions proceeding in the reformer include steam reforming, partial oxidization reforming, and a combination thereof.

The embodiments discussed above include only one stack of polymer electrolyte fuel cells. The fuel-cells generator system may, however, include two or more stacks of polymer electrolyte fuel cells. In the latter structure, the respective stacks of polymer electrolyte fuel cells have different operating conditions and it is thus preferable to carry out the control of each embodiment for each stack of fuel cells.

Although the embodiments discussed above include the polymer electrolyte fuel cells, the principle of the present invention is also applicable to phosphate fuel cells and direct methanol fuel cells, in which the catalyst is poisoned.

The present invention is not restricted to the above embodiments or their modified examples, but there may be many other modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. A fuel-cells generator system using fuel cells, which receive a supply of a reaction gas fed to an electrode with a catalyst carried thereon and generate an electromotive force through a chemical reaction of said reaction gas, said fuel-cells generator system comprising:

lowered output detection means for detecting a decrease in output of said fuel cells;

poisoned state detection means for detecting a poisoned state of said catalyst;

temperature control means for, when said poisoned state detection means detects the poisoned state of said catalyst and said lowered output detection means detects a decrease in output of said fuel cells, increasing temperature of said fuel cells; and gas pressure control means for regulating pressure of said reaction gas supplied to said electrode in response to the temperature control by said temperature control means, thereby enabling partial vapor pressure in said reaction gas to be kept within a predetermined range.

2. A fuel-cells generator system in accordance with claim 1, said fuel-cells generator system further comprising:

gas utilization ratio calculation means for calculating a degree of utilization of said reaction gas in said fuel cells as a gas utilization ratio; and prohibition means for, when the gas utilization ratio calculated by said gas utilization ratio calculation means is not less than a predetermined value, prohibiting operations of said temperature control means and said gas pressure control means.

3. A fuel-cells generator system in accordance with claim 1, said fuel-cells generator system further comprising:

impedance measurement means for measuring an impedance of said fuel cells; and prohibition means for, when the impedance measured by said impedance measurement means is out of a predetermined range, prohibiting operations of said temperature control means and said gas pressure control means.

4. A fuel-cells generator system in accordance with claim 1, wherein said poisoned state detection means comprises:

carbon monoxide concentration detection means for observing a concentration of carbon monoxide included in said reaction gas; and means for detecting the poisoned state of said catalyst, based on the observed concentration of carbon monoxide.

5. A fuel-cells generator system in accordance with claim 4, wherein said carbon monoxide concentration detection means comprises:

an electrolyte membrane;

two electrodes arranged across said electrolyte membrane and having a catalyst carried thereon;

a reaction gas supply conduit for feeding a supply of said reaction gas to one of said two electrodes;

an oxidizing gas supply conduit for feeding a supply of an oxygen-containing, oxidizing gas to the other of said two electrodes;

potential difference measurement means for measuring a potential difference between said two electrodes under the condition that a predetermined load is connected between said two electrodes; and carbon monoxide concentration calculation means for calculating the concentration of carbon monoxide included in said reaction gas, based on the potential difference measured by said potential difference measurement means.

6. A fuel-cells generator system in accordance with claim 1, said fuel-cells generator system further comprising:

a reformer for reforming methanol and producing a hydrogen-rich gas as said reaction gas;

methanol concentration detection means for observing a concentration of methanol included in said reaction gas; and reformer operation control means for, when the concentration of methanol observed by said methanol concentration detection means is not less than a predetermined level and said lowered output detection means detects a decrease in output of said fuel cells, controlling operation of said reformer, thereby lowering the concentration of methanol included in said reaction gas.

7. A fuel-cells generator system in accordance with claim 6, wherein said poisoned state detection means comprises:

an electrolyte membrane;

two electrodes arranged across said electrolyte membrane and having a catalyst carried thereon;

a reaction gas supply conduit for feeding a supply of said reaction gas to one of said two electrodes;

an oxidizing gas supply conduit for feeding a supply of an oxygen-containing, oxidizing gas to the other of said two electrodes;

potential difference measurement means for measuring a potential difference between said two electrodes; and load switching means for switching between a first state, in which a predetermined load is connected between said two electrodes, and a second state, in which said predetermined load is disconnected from said two electrodes;

said methanol concentration detection means comprising:

methanol concentration calculation means for calculating the concentration of methanol included in said reaction gas, based on the potential difference measured by said potential difference measurement means, in said second state selected by said load switching means.

8. A fuel-cells generator system in accordance with claim 7, wherein said poisoned state detection means further comprises:

carbon monoxide concentration calculation means for calculating a concentration of carbon monoxide included in said reaction gas, based on the potential difference measured by said potential difference measurement means, in said first state selected by said load switching means; and means for detecting the poisoned state of said catalyst, based on the calculated concentration of carbon monoxide.

9. A fuel-cells generator system in accordance with claim 1, wherein each of said fuel cells comprise:

an electrolyte membrane;

a first electrode arranged in close contact with one surface of said electrolyte membrane as said electrode receiving a supply of said reaction gas; and a second electrode arranged in close contact with the other surface of said electrolyte membrane and receiving a supply of an oxygen-containing, oxidizing gas, said fuel-cells generator system further comprising:

oxidizing gas pressure control means for regulating pressure of said oxidizing gas fed to said second electrode, thereby enabling the pressure of said oxidizing gas and the pressure of said reaction gas fed to said first electrode to satisfy a predetermined relationship.

10. A fuel-cells generator system in accordance with claim 9, wherein said predetermined relationship enables the pressure of said oxidizing gas and the pressure of said reaction gas to hold a fixed order of magnitude.

11. A fuel-cells generator system in accordance with claim 9, wherein said predetermined relationship enables a difference between the pressure of said oxidizing gas and the pressure of said reaction gas to be not greater than a predetermined value.

12. A fuel-cells generator system in accordance with claim 9, wherein said predetermined relationship enables a difference between the pressure of said oxidizing gas and the pressure of said reaction gas to be kept constant.

13. A fuel-cells generator system in accordance with claim 1, said fuel-cells generator system further comprising:

restoration means for, when no decrease in output of said fuel cells is detected by said lowered output detection means after execution of the pressure regulation of said reaction gas by said gas pressure control means, returning the temperature of said fuel cells to a non-controlled temperature of said fuel cells, which represents a value before the increase by said temperature control means, and returning the pressure of said reaction gas to a non-controlled pressure of said reaction gas, which represents a value before the regulation by said gas pressure control means.

14. A method of generating electricity from fuel cells, which receive a supply of a reaction gas fed to an electrode with a catalyst carried thereon and generate an electromotive force through a chemical reaction of said reaction gas, said method comprising the steps of:

(a) controlling temperature of said fuel cells to be higher than an optimum operating temperature; and (b) regulating pressure of said reaction gas supplied to said electrode in response to the temperature control carried out in said step (a), thereby enabling partial vapor pressure in said reaction gas to be kept within a predetermined range.

15. A method of generating electricity from fuel cells, which receive a supply of a reaction gas fed to an electrode with a catalyst carried thereon and generate an electromotive force through a chemical reaction of said reaction gas, said method comprising the steps of:

(a) detecting a decrease in output of said fuel cells;

(b) detecting a poisoned state of said catalyst;

(c) when the poisoned state of said catalyst is detected in said step (b) and a decrease in output of said fuel cells is detected in said step (a), increasing temperature of said fuel cells; and (d) regulating pressure of said reaction gas supplied to said electrode in response to the temperature control carried out in said step (c), thereby enabling partial vapor pressure in said reaction gas to be kept within a predetermined range.

16. A method in accordance with claim 15, said method further comprising the steps of:

(e) calculating a degree of utilization of said reaction gas in said fuel cells as a gas utilization ratio; and (f) when the gas utilization ratio calculated in said step (e) is not less than a predetermined value, prohibiting operations of said steps (c) and (d).

17. A method in accordance with claim 15, said method further comprising the steps of:

(e) measuring an impedance of said fuel cells; and (f) when the impedance measured in said step (e) is out of a predetermined range, prohibiting operations of said steps (c) and (d).

18. A method in accordance with claim 15, wherein said step (b) comprises the steps of:

(b-1) observing a concentration of carbon monoxide included in said reaction gas; and (b-2) detecting the poisoned state of said catalyst, based on the observed concentration of carbon monoxide.

19. A method in accordance with claim 15, said method further comprising the steps of:

(e) reforming methanol and producing a hydrogen-rich gas as said reaction gas;

(f) observing a concentration of methanol included in said reaction gas; and (g) when the concentration of methanol observed in said step (f) is not less than a predetermined level and a decrease in output of said fuel cells is detected in said step (a), controlling operation of said step (e), thereby lowering the concentration of methanol included in said reaction gas.

20. A method in accordance with claim 15, said method further comprising the steps of:

(e) when no decrease in output of said fuel cells is detected in said step (a) after execution of the pressure regulation of said reaction gas in said step (d), returning the temperature of said fuel cells to a non-controlled temperature of said fuel cells, which represents a value before the increase in said step (c), and returning the pressure of said reaction gas to a non-controlled pressure of said reaction gas, which represents a value before the regulation in said step (d).

* * * * *